United States Patent
Lewis, III

(10) Patent No.: US 12,108,516 B1
(45) Date of Patent: Oct. 1, 2024

(54) APPARATUS AND METHOD FOR TREATING A GROWTH MEDIUM VIA AN ELECTRICAL DISCHARGE

(71) Applicant: Nox Box Technologies, LLC, Ormond Beach, FL (US)

(72) Inventor: Joseph E. Lewis, III, Ormond Beach, FL (US)

( * ) Notice: Subject to any disclaimer, the term of this patent is extended or adjusted under 35 U.S.C. 154(b) by 0 days.

(21) Appl. No.: 18/222,053

(22) Filed: Jul. 14, 2023

(51) Int. Cl.
*A01C 1/00* (2006.01)
*A01G 24/00* (2018.01)
*H05H 1/46* (2006.01)

(52) U.S. Cl.
CPC ............. *H05H 1/466* (2021.05); *A01G 24/00* (2018.02)

(58) Field of Classification Search
CPC ........ H05H 1/466; A01G 24/00; A01G 24/60; C02F 1/4608
See application file for complete search history.

(56) References Cited

U.S. PATENT DOCUMENTS

| | | | |
|---|---|---|---|
| 9,540,257 B2 | 1/2017 | Cho | |
| 10,793,447 B2 | 10/2020 | Kang | |
| 2016/0102025 A1* | 4/2016 | Nunnally | A01G 7/06 422/162 |
| 2017/0291830 A1* | 10/2017 | Kang | H01J 37/32568 |
| 2020/0071199 A1* | 3/2020 | Lewis, III | H05H 1/48 |
| 2021/0354105 A1* | 11/2021 | Lewis, III | B01J 19/088 |
| 2022/0174808 A1* | 6/2022 | Kang | H05H 1/247 |
| 2022/0418077 A1* | 12/2022 | Hill | H05H 1/466 |

* cited by examiner

*Primary Examiner* — Carib A Oquendo
(74) *Attorney, Agent, or Firm* — Lori Sandman, Esq.

(57) ABSTRACT

An apparatus for treating a growth medium via an electrical discharge, the apparatus includes a treatment chamber, at least a reservoir, a plasma reactor, an injector, an pressure regulation system, and in ignition unit including a voltage source configured to provide an electrical voltage, a converter configured to convert the electrical voltage from a DC voltage input to an AC voltage output, and an electrical connection interface configured to electrically connect the converter to an electrode of a pair of electrodes disposed in the plasma reactor, a feedback mechanism comprising a sensor configured to detect reaction data, and a control module configured to initiate a generation of an electrical discharge in a reaction region as a function of the AC voltage output, wherein the reaction region is configured to enable an interaction between the electrical discharge and a growth medium.

20 Claims, 7 Drawing Sheets

APPARATUS AND METHOD FOR TREATING A GROWTH MEDIUM VIA AN ELECTRICAL DISCHARGE

FIELD OF THE INVENTION

The present invention generally relates to the field of Non-thermal Plasma (NTP) technology. In particular, the present invention is directed to an apparatus and method for treating a growth medium via an electrical discharge.

BACKGROUND

Plants regularly undergo a multitude of stresses such as, without limitation, scarcity of water, waterlogging, toxicity, high salinity, extreme temperatures, and the like. These stresses result in less yield of crops. To enhance seed germination and growth under the changing environment, techniques such as chemical, physical, and biological treatment are developing. However, most existing treatments may result in the change of seed morphology, gene expression, protein level. Crops grown with such treatment may potentially be toxic to humans and/or the environment.

SUMMARY OF THE DISCLOSURE

In an aspect, an apparatus for treating a growth medium via an electrical discharge is described. The apparatus includes a treatment chamber, at least a reservoir, a plasma reactor, an injector, an pressure regulation system, and in ignition unit including a voltage source configured to provide an electrical voltage, a converter configured to convert the electrical voltage from a direct current (DC) voltage input to an alternating current (AC) voltage output, and an electrical connection interface configured to electrically connect the converter to at least one electrode of a pair of electrodes disposed in the plasma reactor, wherein the pair of electrodes includes a first electrode and a second electrode, a feedback mechanism comprising a sensor configured to detect reaction data, and a control module communicatively connected to the feedback mechanism, wherein the control module is configured to initiate a generation of an electrical discharge in a reaction region disposed between the first electrode and the second electrode as a function of the AC voltage output, wherein the reaction region is configured to enable an interaction between the electrical discharge and a growth medium contained in the treatment chamber.

In another aspect, a method for treating a growth medium via an electrical discharge is described. The method includes providing, by a voltage source, an electrical voltage, converting, by a converter, the electrical voltage from a direct current (DC) voltage input to an alternating current (AC) output, connecting, by an electrical connection interface, the converter to at least one electrode of a pair of electrodes disposed in the plasma reactor electrically, wherein the pair of electrodes includes a first electrode and a second electrode, initiating, by a control module, a generation of an electrical discharge in a reaction region disposed between the first electrode and the second electrode, enabling, by the reaction region, an interaction between the electrical discharge and a growth medium contained in the treatment chamber, and detecting, by a feedback mechanism, reaction data using a sensor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
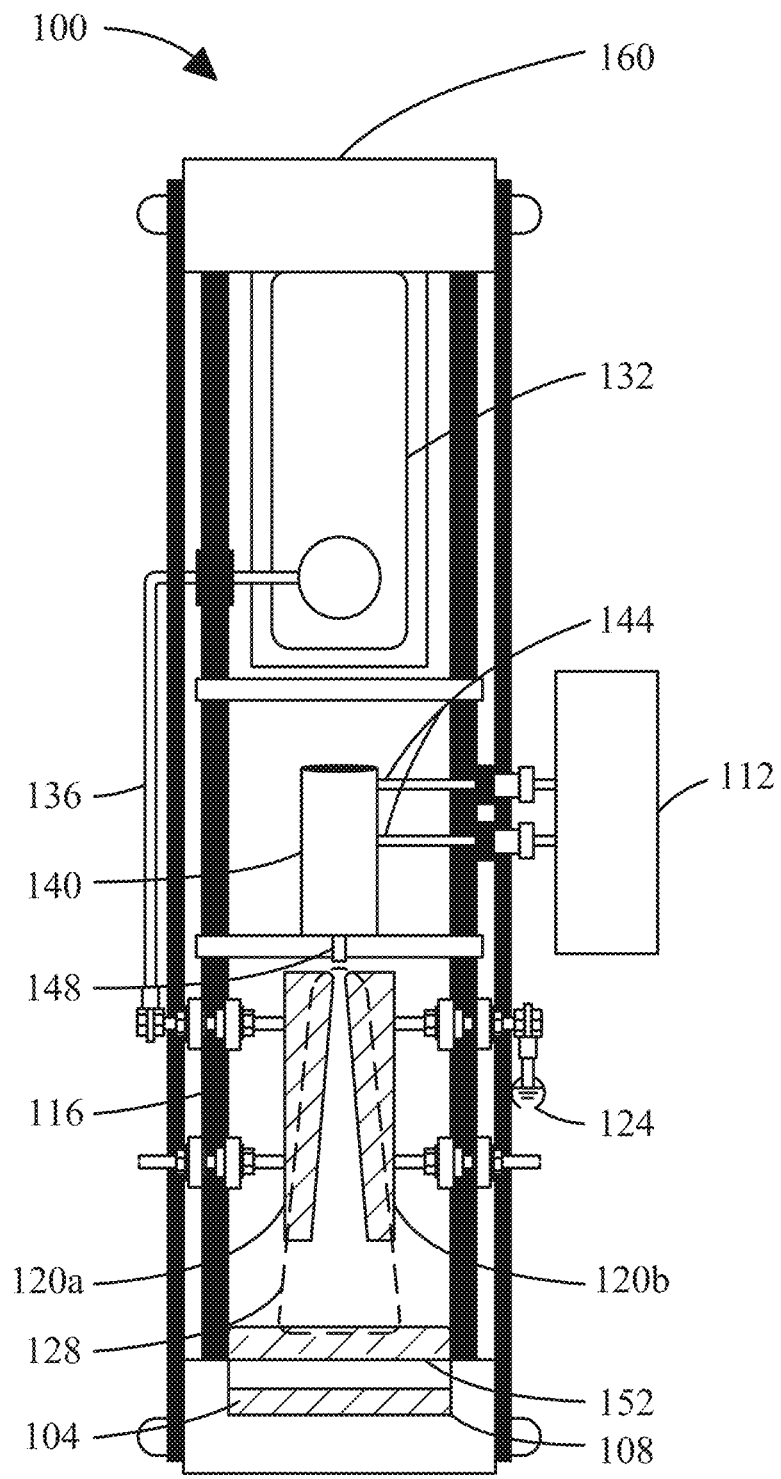
FIG. 1 is an exemplary embodiment of an apparatus for treating a growth medium via an electrical discharge.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for treating a growth medium via an electrical discharge. In an embodiment, the apparatus includes a plasma reactor, wherein the plasma reactor includes at least a pair of electrodes containing a first electrode and a second electrode, configured to produce an electrical discharge. The plasma reactor further includes a reaction region disposed between the first electrode and the second electrode, wherein the reaction region is configured to enable an interaction between the electrical discharge and a growth medium contained in a treatment chamber.

Aspects of the present disclosure can be used to generate reactive oxygen and nitrogen species (RONS) and change solution properties pH, electrical conductivity, and oxidation-reduction potential. Aspects of the present disclosure can also be used to affect the rate of the growth medium (e.g., seed) germination, enhancement in plant growth, as well as an increase in agricultural yields. This is so, at least in part, because the apparatus is configured to expose growth medium to a non-thermal plasma (NTP) using a high energy ignition system. The apparatus may generate a high voltage NTP using air, water, and an electrical load without any harmful emission.

Aspect of the present disclosure can be used to monitor the electrical discharge and/or growth medium and provide necessary information to the user of the apparatus. This is so, at least in part, because the apparatus includes an ignition unit with a feedback mechanism configured to detect reaction data. In an embodiment, reaction data may include plurality of electrical discharge parameters, fluid parameters, growth medium parameters, and the like.

Aspect of the present disclosure can be used to optimize the treatment process for the growth medium, adapting changes in the electrical voltage, fluid, and/or other factors that may affect the electrical discharge. This is so, at least in part, because the apparatus includes an ignition unit with a control module communicatively connected to the feedback mechanism, wherein the control module is configured to regulate electrical discharge generation in a reaction region. Control module may adjust at least a treatment parameter of the apparatus as a function of the reaction data detected by the feedback mechanism during an interaction between the electrical discharge and the growth medium contained in the treatment chamber.

Aspects of the present disclosure allow for growth medium treatment under low-temperature without damaging growth medium. Exemplary embodiments illustrating aspects of the present disclosure are described below in the context of several specific examples.

Now referring to FIG. 1, an exemplary embodiment of an apparatus 100 for treating a growth medium 104 via an electrical discharge is illustrated. As used in this disclosure, a "growth medium" is a substance or material that provides essential nutrients and environmental conditions for the growth and proliferation of microorganisms, cells, tissues. In an embodiment, one or more seeds may be placed in growth medium 104. "Seeds," for the purpose of this disclosure, are a mature, fertilized ovule of a flowering plant (i.e., angiosperms) that contains an embryonic plant within a protective outer covering, serve as the primary means of reproduction for many plant species, enabling them to disperse and establish new plants. In some embodiments, seeds may include, without limitation, cereal seeds (e.g., wheat, rice, corn, barley, oats, millets, and the like), legume seeds (e.g., soybeans, peas, beans, lentils, chickpeas, peanuts, and the like), oilseeds (e.g., sunflower, rapeseed, flaxseed, sesame, safflower, and the like), vegetable seeds (e.g., tomatoes, peppers, cucumbers, eggplants, lettuce, spinach, and the like), and fruit seeds (e.g., watermelon, muskmelon, apple, citrus, and the like). In such embodiment, growth medium 104 may include a nutrient-rich environment that provides the essential conditions for germination and growth of the seeds. In some cases, growth medium may provide environmental factors such as, without limitation, temperature, pH level, oxygen, and the like required for the seed to germinate and develop into a healthy plant. In a non-limiting example, growth medium 104 may include soil, wherein the soil may include a complex mixture of mineral particles, organic matter, water, air, living organisms, and the like. In another non-limiting example, growth medium 104 may include soilless mix or a specially formulated medium designed for seed germination and plant growth.

With continued reference to FIG. 1, apparatus 100 includes a treatment chamber 108 configured to contain growth medium 104. As used in this disclosure, a "treatment chamber" is a space designed to hold a specific material, substance, object and subject it to a particular treatment. In an embodiment, treatment chamber 108 may be constructed as an open system; for instance, and without limitation, treatment chamber 108 may include an open-top container. In another embodiments, treatment chamber 108 may be constructed as a closed system; for instance, and without limitation, treatment chamber 108 may be an enclosed container with an airtight seal. In some embodiments, treatment chamber 108 may be designed to provide easy access to the growth medium 104 being treated. In a non-limiting example, treatment chamber 108 may include removable or hinged doors or ports for loading and/or unloading growth medium 104. In another non-limiting example, treatment chamber 108 may include one or more window with/without cover for visual inspection or sampling during the treatment process.

With continued reference to FIG. 1, apparatus 100 includes at least a reservoir 112. As used in this disclosure, a "reservoir" is a container or storage chamber designed to hold at least a fluid used in the treatment process. In a non-limiting example, reservoir 112 is configured to contain at least a fluid. A "fluid" as used in this disclosure is defined as a gas or fluid. Reservoir may provide a consistent and controlled supply of at least a fluid for the treatment of growth medium 104 as described in further detail below. In an embodiment, fluid may include a substance that enables the production of electrical discharge. In some cases, at least a fluid may include liquid; for instance, and without limitation, at least a fluid may include water, organic solvents, electrolyte solutions, and the like. In other cases, at least a fluid may include one or more gases; for instance, and without limitation, at least a fluid may include inert gases (e.g., nitrogen, argon, helium, neon, and the like), oxygen, carbon dioxide, air, reactive gases (e.g., hydrogen, ammonia, sulfur hexafluoride, and the like), and the like. Additionally, or alternatively, apparatus 100 may include a plurality of reservoirs. In an embodiment, at least a reservoir 112 may include a first reservoir configured to contain a first fluid and a second reservoir configured to contain a second fluid, wherein the first fluid may include at least a gas and the second fluid may include at least a liquid.

With continued reference to FIG. 1, at least a reservoir 112 may be constructed from materials that are compatible with at least a fluid being stored. For example, and without limitation, at least a reservoir 112 may be made from material such as corrosion-resistant metals, plastics, and/or glass. In some cases, at least a reservoir 112 may be appropriately sized to provide an adequate supply of fluid throughout the treatment process without frequent refilling or interruptions. In an embodiment, fluid may be supplied by a pressurized hose or tube. At least a reservoir 112 may include at least an inlet, at least an outlet, or both. In a non-limiting example, at least an inlet may be used for filling at least a reservoir 112 with at least a fluid and at least an outlet may be connected to an injector or other fluid delivery component of apparatus 100 such as a pressure regulation system as described in further detail below. At least a fluid may be input through the at least an inlet into at least a reservoir 112 and/or output through the at least an outlet to injector. In the case of apparatus 100 having a plurality of reservoirs, each reservoir of plurality of reservoirs may include at least an inlet and at least an outlet. In a non-limiting example, first reservoir configured to contain first fluid may include a first inlet and a first outlet, second reservoir configured to contain second fluid may include a second inlet and a second outlet, wherein the first inlet/first outlet may never intersect with second inlet/second outlet. In such an embodiment, first fluid and second fluid may not contact each other before output through first outlet/second outlet.

With continued reference to FIG. 1, apparatus 100 includes a plasma reactor 116. As used in this disclosure, a "plasma reactor" is a device configured to generate, sustain, and/or control plasma. "Plasma," for the purpose of this disclosure, refers to the fourth state of matter, in addition to solid, liquid, and gas. Plasma may include a partially ionized gas consisting of a mixture of ions, electrons, and/or neutral particles (i.e., atoms and molecules). In an embodiment, plasma may be formed when at least a fluid subject to high-energy source, such as, without limitation, heat, radiation, electric filed, and the like, causing the atoms or molecules in at least a fluid to become ionized by losing or gaining electrons. At least a fluid may be inputted into plasma reactor 116 using injector as described below in this disclosure. In some cases, plasma may include non-thermal plasma (NTP), wherein the non-thermal plasma is a type of plasma in which the electron temperature is significantly higher than the temperature of the heavier ions and neutral particles. In this case, while the electrons in plasma have high kinetic energy, the overall temperature of at least a fluid may remain relatively low (e.g., often near room temperature of 20-22 C/68-72 F). Additionally, or alternatively, the energy distribution among particles within non-thermal plasma may not be in thermal equilibrium due to the electrons, being much lighter than ions and neutral particles, may gain energy more rapidly when subjected to an electric or magnetic field, leading to a higher electron temperature. On the other hand, heavier ions and neutral particles may move more slowly and remain cooler, resulting in low temperature of at least a fluid.

With continued reference to FIG. 1, plasma reactor 116 includes at least a pair of electrodes 120a-b, wherein the at least a pair of electrodes includes a first electrode 120a and a second electrode 120b. As used in this disclosure, an "electrode" is a conductor that is used to make electrical contact with a conductive medium and/or a medium that can become conductive given a sufficient voltage differential, such as at least a fluid as described above. At least a pair of electrodes 120a-b is configured to produce an electrical discharge as a function of at least a fluid. As used in this disclosure, an "electrical discharge" refers to a phenomenon where an electric current flows between two or more conductive surfaces (i.e., at least a pair of electrodes 120a-b) through at least a fluid, causing ionization and the subsequent release of energy in the form of light, heat, or sound. In a non-limiting example, at least a pair of electrodes 120a-b may receive a voltage, supplied by an ignition unit as described in further detail below, wherein the voltage may be applied across the surface of at least a pair of electrodes 120a-b, creating an electric field between first electrode 120a and second electrode 120b. Such electric field may accelerate free electrons and other charged particles in at least a fluid, initiating a cascade of ionization event, thereby resulting in a formation of a conductive channel of charged particles (i.e., plasma) such as ions and electrons that allow electric current to flow between first electrode 120a and second electrode 120b.

With continued reference to FIG. 1, each electrode of at least a pair of electrodes 120a-b may be constructed from a metal or a metal alloy such as copper that has certain electrical conductivity and capability to withstanding high temperatures and chemical reactions. In an embodiment, at least a pair of electrodes 120a-b may include at least a cathode and at least an anode. A "cathode," for the purpose of this disclosure, is an electrode that is negatively charged in an electrical circuit, while an "anode," for the purpose of this disclosure, is an electrode that is positively charged in the electrical circuit. In some cases, at least a cathode may be an electrode where reduction occurs (i.e., meaning that it gains electrons) and at least an anode may be an electrode where oxidation occurs (i.e., meaning that it loses electrons). In a non-limiting example, first electrode 120a may include an anode electrically connected to ignition unit as described above and second electrode 120b may include cathode electrically connected to a ground 124. As used in this disclosure, a "ground" is a common reference point or a conductive path that provides a baseline for measuring voltages, a return path for electric currents, and a means for safely dissipating excess electrical energy. Ground 124 may be connected to an earth's conductive surface or otherwise directly or through a grounding electrode conductor. Such connection may establish a reference voltage level (i.e., zero volts), against which other voltages within apparatus 100 may be measured. Additionally, or alternatively, ground 124 may provide a pathway for excess electrical energy to safely dissipate into the earth, reducing the risk of electrical shock, fires, or equipment damage of apparatus 100.

With continued reference to FIG. 1, plasma reactor includes a reaction region 128 disposed between first electrode 120a and second electrode 120b, wherein the reaction region 128 is configured to enable an interaction between electrical discharge (i.e., plasma) and growth medium 104. As used in this disclosure, a "reaction region" is a designated area or space within plasma reactor 116 where specific chemical or physical reactions take place. In some embodiments, generating plasma in reaction region may include generating reactive oxygen species (ROS) and reactive nitrogen species (RNS), wherein both species are highly reactive molecules primarily formed through an interaction of molecular oxygen ($O_2$) and molecular nitrogen ($N_2$) with high-energy species, such as free radicals, ions, and/or electrons generated through electrical discharge as described above. In some cases ROS may include, without limitation, superoxide ($O_2-$), hydroxyl radical (OH), hydrogen peroxide ($H_2O_2$). Plasma may collide with $O_2$ molecules, causing dissociation, ionization, or excitation, which subsequently leads to the formation of ROS through further reactions. In some cases, RNS may include, without limitation, nitric oxide (NO), nitrogen dioxide ($NO_2$), peroxynitrite (ONOO—), and the like. Plasma may collide with $N_2$ molecules or other nitrogen-containing molecules, causing dissociation, ionization, or excitation, which subsequently leads to the formation of RNS through further reactions. In an embodiment, additional acids may be produced such as nitrous acid ($HNO_2$) and nitric acid ($HNO_3$) due to the interaction of plasma, oxygen, nitrogen and water. These acids may further oxidize to form $NO_2$ and $NO_3$.

Still referring to FIG. 1, ROS and RNS may drive various chemical and physical reactions within reaction region 128 of plasma reactor 116 during the treatment process. In an embodiment, ROS and RNS may readily participate in oxidation and reduction reactions; for instance, and without limitation, ROS and RNS may oxidize organic compounds, reducing stability of the organic compounds, and leading to their degradation or modification. In another embodiment, ROS and RNS may effectively inactivate or kill microorganisms such as bacteria, viruses, fungi, and the like; for instance, and without limitation, ROS and RNS may damage microorganisms' cellular structures and disrupting their metabolic functions by attacking cell wall, cell membrane, proteins, nucleic acids, and the like. In a further embodiment, ROS and RNS may modulate cellular processes such as cell signaling, gene expression, immune response and the like in both prokaryotic and eukaryotic cells; for instance, and without limitation, in low concentrations, ROS and RNS may act as signaling molecules that regulate cellular functions, while at higher concentrations, they may induce cellular stress, damage, or apoptosis. In other embodiments, ROS and RNS may also react with other molecules or species to generate secondary reactive species.

In a non-limiting example, and continue referring to FIG. 1, reaction region 128 may include a space between first electrode 120a and second electrode 120b where the electrical charge takes place and plasma is generated as a function of at least a fluid. In an embodiment, reaction region 128 may include a gap between at least a pair of electrodes 120*a-b*, wherein first electrode 120*a* may be parallel to second electrode 120*b* (i.e., in a corona discharge). In another embodiment, reaction region 128 may include a cylindrical space within a coaxial electrode arrangement. In a non-limiting example, at least a pair of electrodes 120*a-b* may be arranged in a diverging configuration (i.e., in a gliding arc discharge). In yet another embodiment, the electrodes may be in a singular tapered designed having a wide portion and a narrow position, in this configuration the electrodes may be mounted in the center of a round metal cylinder and both gas and water maybe introduced in a tangential method in order to elongate the arc or plasma discharge. First electrode 120*a* may be configured to diverge from second electrode 120*b* in diverging configuration; for instance, and without limitation, first electrode 120*a* and second electrode 120*b* may be slightly tilted. At least a pair of electrodes 120*a-b* may include an air gap in between first electrode 120*a* and second electrode 120*b*, wherein the air gap may be narrow on one end and gradually widen towards another end. For example, and without limitation, first electrode 120*a* may be closer together at one end and further apart at the other end. In some cases, each electrode of at least a pair of electrodes 120*a-b* may include various shapes, such as, without limitation, linear, curved, spiral, and the like. In some cases, each electrode of at least a pair of electrodes 120*a-b* may be placed symmetrically on both sides of plasma reactor 116 along the fluid output axis of fluid outlet of injector as described below. The distance between first electrode 120*a* and second electrode 120*b* may be adjusted to control the intensity of electrical discharge.

Further referring to FIG. 1, in some embodiments, reaction region 128 may include a plurality of points of arc between first electrode 120*a* and second electrode 120*b*. As used in this disclosure, a "point of arc" refers to a flow of electrons between first electrode 120*a* and second electrode 120*b*. In some cases, point of arc may mark a starting point of electrical discharge. In some cases, position of point of arc may be influenced by various factors such as geometry and material of at least a pair of electrodes 120*a-b*, distance between first electrode 120*a* and second electrode 120*b* within at least a pair of electrodes 120*a-b*, received voltage, properties of at least a fluid, and the like. In a non-limiting example, point of arc may include a region where the electrical current "jumps" or "arcs" from first electrode 120*a* to electrode 120*b*. A first point of arc may be formed at the narrowest gap between first electrode 120*a* and second electrode 120*b*. First point of arc may include a maximally intense electrical field. As plasma is generated, by plasma reactor 116 through electrical discharge, first point of arc may move along the surface of at least a pair of electrodes 120*a-b* due to the influence of the electric field and the flow of at least a fluid. Such movement may introduce the rest of plurality of points of arcs along the surface of at least a pair of electrodes 120*a-b* and ensure a continuous, non-equilibrium plasma that enhances the generation of ROS and/or RNS described above. Plasma reactor 116 and elements thereof will be described in further detail below with reference to FIG. 2.

With continued reference to FIG. 1, apparatus 100 includes an ignition unit 132 electrically connected to at least an electrode of at least a pair of electrodes 120*a-b*. As used in this disclosure, an "ignition unit" is an electrical component responsible for supplying an initial electrical voltage necessary to initiate electrical discharge between electrodes. In a non-limiting example, ignition unit is configured to supply an electrical voltage to at least an electrode. At least an electrode may include first electrode 120*a* (i.e., anode), Ignition unit 132 may include a power source. As used in this disclosure, a "power source" is any system, device, or means that provides power such as, without limitation, electric power to a device. Power source may provide electrical power to ignition unit 132 and/or other devices/components within apparatus 100 described in this disclosure, such as, without limitation, plasma reactor 116, injector, any computing device and/or the like. In a non-limiting example, apparatus 100 may be electrically connected to a power source. In some embodiments, power source may be externally electrically connected to apparatus 100. In such an embodiment, power source may include an external power source such as, without limitation, a wall outlet. In some cases, transmitting electric power may include using one or more continuous conductor 136. A "continuous conductor," as described herein, is an electrical conductor, without any interruption, made from electrically conducting material that is capable of carrying electrical current over a distance. Electrically conductive material may include any material that is conductive to electrical current and may include, as a nonlimiting example, various metals such as copper, steel, or aluminum, carbon conducting materials, or any other suitable conductive material.

With continued reference to FIG. 1, in some embodiments, ignition unit 132 may be configured to convert a lower input voltage (e.g., 110V/220V for AC voltages or 12V/24V for DC voltages) from power source into a higher output voltage, thereby providing necessary electrical energy to drive plasma reactor 116. In a non-limiting example, ignition unit 132 may include an ignition transformer. As used in this disclosure, an "ignition transformer" is an electrical transformer designed to generate a high voltage output which is used to initiate electrical discharge as described above, wherein the electrical transformer is a passive electrical device that transfers electrical energy from one circuit to another through the process of electromagnetic induction. In some cases, electrical transformer may be used to increase or decrease the voltage levels of alternating current (AC) electrical signal while maintaining the same frequency. In a non-limiting example, ignition transformer may be configured to step up the input voltage from a lower level (from power source) to a higher voltage level required by plasma reactor 116 to create an electrical arc (i.e., point of arc). In some embodiments, ignition transformer may include two sets of windings, wherein the two sets of windings may include a primary winding and a secondary winding. Two sets of windings may be wound around a magnetic core. In some cases, primary winding may be connected to lower voltage input, while secondary winding may generate high voltage output. In a non-limiting example, ignition unit 132 may include ignition transformer configured to converts electrical power received from power source into a high-voltage discharge of voltage range of 6 kV to 30 kV. In another embodiment, the voltage range may be 3 kV to 18 k.

With continued reference to FIG. 1, in some embodiments, ignition unit 132 may include a power regulator (i.e., filter). As described in this disclosure, a "power regulator" is an electric device in power source 108 that performs electrical power regulation or redistribution, wherein "power regulation" or "power redistribution," as described herein, refers to a process that keeps voltage of power source below its maximum value during operation, non-operation, or charging. In a non-limiting example, power regulator may be used to remove or attenuate unwanted frequencies, noise, or voltage fluctuations from the output voltage or current. Power regulator may include, without limitation, passive filter, active filter, EMI/RFI filter, voltage regulator, and the like. Additionally, or alternatively, ignition unit 132 may include a balancer. As described herein, a "balancer" is an electric that performs power balancing, wherein "power balancing," for the purpose of this disclosure, refers to a process that balances electric energy from one or more first power sources (e.g., strong batteries) to one or more second power sources (e.g., weaker batteries). A person skilled in the art, upon reviewing the entirety of this disclosure, will be aware of various devices/components that may be used within ignition unit 132 of apparatus 100. Ignition unit 132 will be described in further detail below with reference to FIG. 4.

With continued reference to FIG. 1, apparatus 100 includes an injector 140 in fluidic connection with at least a reservoir 112. As used in this disclosure, an "injector" is a component designed to introduce at least a fluid into plasma reactor 116—specifically in reaction region 128 of plasma reactor 116. In a non-limiting example, injector 140 is configured to feed at least a fluid through reaction region. At least a fluid may then be used by the plasma reactor 116 to generate plasma. "Fluidic connection," for the purpose of this disclosure, refers to a pathway or link that enables the transfer of at least a fluid. In a non-limiting example, fluidic connection between injector 140 and at least a reservoir 112 may be established using various components such as, without limitation, tubes, pipes, hoses, channels, or the like to create a continuous pathway for the flow of at least a fluid.

With continued reference to FIG. 1, injector 140 may include at least a fluid inlet 144. As used in this disclosure, a "fluid inlet" is an entry point through which at least a fluid is introduced into injector 140 before being fed into reaction region 128 of plasma reactor 116 or any other process described in this disclosure. In a non-limiting example, at least a fluid inlet 144 may be connected with outlet of at least a reservoir 112 as described above. In some cases, at least a fluid inlet 144 may be designed to provide a secure, leak-free connection with the at least reservoir; for instance, and without limitation, at least a fluid inlet 144 may be sealed using one or more sealing elements such as O-rings, gaskets, thread sealants, and the like to ensure a tight seal and/or prevent leaks or contamination. Injector 140 may include at least a fluid outlet 148. As used in this disclosure, a "fluid outlet" is an exit point through which at least a fluid is discharged from injector 140 into reaction region 128 of plasma reactor 116. In some cases, at least a fluid outlet 148 may be configured to allow at least a fluid to be released into the intended location within reaction region 128. For example, and without limitation, at least a fluid outlet 148 may be placed at the center and right above at least a pair of electrodes 120*a-b*. At least a fluid outlet 148 may be in a distance with at least a pair of electrodes 120*a-b* or reaction region 128. Such distance may impact the time and space available for at least a fluid to mix and interact with the plasma or other process components. In some cases, at least a fluid outlet 148 may be configured to provide an optimal flow pattern and dispersion of the at least a fluid into reaction region 128. In a non-limiting example, at least a fluid outlet 148 may include a nozzle (i.e., a specially-shaped opening) designed to create a directed, high-velocity stream of at least a fluid, which may improve mixing and dispersion in reaction region 128. Such a nozzle may include, without limitation, swirl nozzle, fan spray nozzle, impinging jet nozzle, multi-hole nozzle, atomizing nozzle, and the like.

Additionally, or alternatively, and still referring to FIG. 1, injector 140 may include one or more valves configured to monitor, control, or otherwise regulate the flow of at least a fluid fed through reaction region 128 of plasma reactor 116. As used in this disclosure, a "valve" is a component that controls fluidic communication between two or more components (e.g., between at least a reservoir 112 and injector 140). Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of hydraulic or pneumatic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by computing device as described in further detail below. Computing device may be in communication with valve, for example by way of one or more of electrical communication, hydraulic communication, pneumatic communication, mechanical communication, and the like. Further, injector 140 and elements thereof will be explained in greater detail below in this disclosure.

With continued reference to FIG. 1, apparatus 100 includes a pressure regulation system configured to transfer at least a fluid to injector. As used in this disclosure, a "pressure regulation system" is a mechanism designed to control and maintain the pressure of at least a fluid, wherein such pressure drives the flow of the at least a fluid into plasma reactor 116. In an embodiment, the flow of fluid may be regulated by the pressure of gas, as higher gas pressure produces more fluid flow. In some cases, higher gas pressure also regulars fluid droplet size, for example, high gas pressure equals smaller water droplet size. In an embodiment, pressure regulation system may include an atmospheric pressure system. As used in this disclosure, an "atmospheric pressure system" is a mechanism that controls the pressure of at least a fluid being introduced into plasma reactor 116 around atmospheric pressure. "Atmospheric pressure," for the purpose of this disclosure, is the pressure exerted by the weight of air in the Earth's atmosphere at sea level, which is approximately 101.3 kilopascals (kPa) or 14.7 pounds per square inch (psi). In some embodiments, pressure regulation system may ensure that at least a fluid being injected into reaction region 128 of plasma reactor 116 is maintained at or near atmospheric pressure. In some embodiments, pressure regulation system may be responsible for transferring the fluid from at least a reservoir 112 to injector 140, providing a consistent and controlled flow of at least a fluid into reaction region 128 of plasma reactor 116.

With continued reference to FIG. 1, in some cases, pressure regulation system may include a flow component connected with at least a reservoir 112 configured to flow at least a fluid from at least a fluid inlet 144 of injector 140 or outlet of at least a reservoir 112 to at least a fluid outlet 148 of injector 140. In some embodiments, flow component may include a passive flow component configured to initiate a passive flow process. As used in this disclosure, a "passive flow component" is a component that imparts a passive flow on at least a fluid, wherein the "passive flow," for the purpose of this disclosure, is flow of fluid, which is induced absent any external actuators, fields, or power sources. A "passive flow process," as described herein, is a plurality of actions or steps taken on passive flow component in order to impart a passive flow on at least a fluid. In a non-limiting example, with pressure regulation system including passive flow component, injector 140 may be able to feed at least a fluid through reaction region 128 as a function of passive flow process. Passive flow component may employ one or more passive flow techniques in order to initiate passive flow process; for instance, and without limitation, passive flow techniques may include osmosis, capillary action, surface tension, pressure, gravity-driven flow, hydrostatic flow, vacuums, and the like. Passive flow component may be in fluidic communication with at least a reservoir 112.

Still referring to FIG. 1, in other embodiments, a flow component may include an active flow component configured to initiate an active flow process. As used in this disclosure, an "active flow component" is a component that imparts an active flow on a fluid, wherein the "active flow," for the purpose of this disclosure, is flow of fluid which is induced by external actuators, fields, or power sources. An "active flow process," as described in this disclosure, is a plurality of actions or steps taken on active flow component in order to impart active flow on at least a fluid. In some embodiments, active flow component may be electrically connected to power source as described above. In a non-limiting example, with pressure regulation system including active flow component, injector 140 may be able to feed at least a fluid through reaction region 128 as a function of active flow process. Pressure regulation system may be configured to pressurize at least a fluid entering reaction region 128 of plasma reactor 116; for instance, and without limitation, active flow component of pressure regulation system may include one or more pumps. Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation, an electric motor or a power take off from power source. Pump may be in fluidic communication with at least a reservoir 112.

With continued reference to FIG. 1, apparatus 100 may further include a condenser 152 disposed within reaction region above or below treatment chamber. As used in this disclosure, a "condenser" is a component configured to collect reactive products generated from electric discharge within reaction region 128 of plasma reactor 116. In some embodiments, condenser 152 may be strategically placed between reaction region 128 configured to collect reactive products before they come into contact with growth medium 104 contained in treatment chamber 108. In some cases, reactive products may include ions, free radicals, electrons, excited molecules, and the like as described above; for instance, and without limitation, ROS and/or RNS. In other cases, reactive products may include byproducts or waste products produced during the treatment process. In a non-limiting example, reactive products may include carbon monoxide (CO) and/or carbon dioxide (CO2), wherein these gases may be produced as a result of the decomposition of growth medium 104 or the reaction of electrical discharge with impurities in growth medium 104. Other exemplary byproducts or waste products may include, without limitation, ozone, volatile organic compounds (VOCs), and the like.

With continued reference to FIG. 1, condenser 152 may include a cooling chamber. As used in this disclosure, a "cooling chamber" is a component configured to rapidly cool reactive products coming (i.e., falling) from reaction region 128 of plasma reactor. In some embodiments, cooling chamber may be configured to ensure efficient heat transfer and maintain optimal temperature conditions for the condensation process. Cooling chamber may be constructed from materials with thermal conductivity, such as, without limitation, copper, aluminum, stainless steel, and the like. In some cases, materials may also be chemically resistant to reactive products and at least a fluid used in the system. Cooling chamber may be non-conductive and constructed from materials such as, without limitation, plastics, glass, fiberglass and the like. In some embodiments, cooling chamber of condenser 152 may be designed in a shape consistent with the shape of plasma reactor 116 or treatment chamber 108; for instance, and without limitation, cooling chamber may be designed in a cylindrical shape, consistent with the shape of plasma reactor 116 and treatment chamber 108 to optimize the flow of reactive products and maximize a contact surface area between a cooling medium and reactive products, wherein the cooling medium may include water, air, refrigerant, and/or the like configured to remove heat from reactive products efficiently. In some cases, interior of cooling chamber may be equipped with fins, coils, plates, and/or the like to further enhance the heat transfer process (i.e., by increasing the surface area of the cooling chamber). In a non-limiting example, cooling chamber may include a heat exchanger, wherein the heat exchanger may be configured to facilitate the transfer of heat from reactive products to the cooling medium.

With continued reference to FIG. 1, condenser 152 may include a collection surface. As used in this disclosure, a "collection surface" is a designated area within condenser 152 where reactive products come into contact with the cooling chamber and undergo a phase change, transitioning from a first state to a second state. In a non-limiting example, collection surface may be configured to enable reactive products in gaseous state to transit to liquid state. Such a transition may allow apparatus 100 to efficiently collect and subsequently handle or transport condensed substances. In some embodiments, collection surface may include various surface features such as, without limitation, ridges, channels, and the like to facilitate the flow of condensed/collected substances. In a non-limiting example, collection surface may include a flat surface, wherein the flat surface may include a plurality of channels or grooves designed to facilitate the flow of condensed reactive products away from collection surface. Additionally, or alternatively, collection surface may include a surface finish; for instance, and without limitation, collection surface may be finished or treated (e.g., using hydrophobic coating, hydrophilic coating, and/or the like) to enhance the wetting properties and reduce surface tension, thereby improving condensation efficiency and fluid flow further.

With continued reference to FIG. 1, condenser 152 may include at least a conduit. As used in this disclosure, a "conduit" is a passageway for substances (i.e., condensed reactive products) to move from one location to another location within apparatus 100. In a non-limiting example, condenser 152 may use one or more conduits to transfer condensed reactive products from collection surface to growth medium 104 contained in treatment chamber 108. In some cases, conduit may be designed with a circular cross-sectional shape. In some cases, conduit may be thermally insulated to maintain a desired temperature of the condensed reactive products and/or prevent any unwanted chemical reactions during transport using material such as fiberglass. In some embodiments, one or more conduits may be connected to collection surface in a manner that ensures a leak-proof connection; for instance, and without limitation, such connection between collection surface and one or more conduits may be established using threaded fittings, compression fittings, flange, and the like. In some embodiments, one or more conduits may be routed from collection surface to treatment chamber 108 with minimized interference with other components of apparatus 100 to ensure a smooth flow of the condensed reactive products; for instance, and without limitation, proper support and/or anchoring of conduits may be installed to prevent conduits from sagging, vibrating, experiencing any other mechanical stress that could cause leaks or damages. Additionally, or alternatively, conduits may incorporate one or more valves to regulate the flow of condensed reactive products into treatment chamber 108. Valves may include any valves described in this disclosure. A person skilled in the art, upon reviewing the entirety of this disclosure, will be aware of various devices/components that may be used within condenser 152 of apparatus 100.

With continued reference to FIG. 1, apparatus 100 may include a housing 160 configured to house various internal components such as, without limitation, treatment chamber 108, plasma reactor 116, ignition unit 132, injector 140, pressure regulation system, condenser 152, and the like thereof. As used in this disclosure, a "housing" is an outer structure or enclosure that contains and supports various internal components of apparatus 100. In some cases, housing 160 may provide protection, stability, and/or organization to apparatus 100. In an embodiment, housing 160 may be designed to accommodate and securely hold internal components of apparatus 100. In some cases, housing 160 may include a plurality of layers, wherein one or more internal components of apparatus 100 may be strategically placed into each layer of plurality of layers, thereby minimizing physical or functional interference between internal components of apparatus 100. In a non-limiting example, housing 160 may include a first layer incorporating ignition unit 132, a second layer incorporating injector 140, a third layer incorporating plasma reactor 116, and a fourth layer incorporating treatment chamber 108 containing growth medium 104. Each layer may be physically isolated but functionally connected in various means (e.g., fluidic connection, electrical connection, and the like thereof); for instance and without limitation, continuous conductor 136 may be used to connect ignition unit 132 and at least an electrode of at least a pair of electrode 120a-b of plasma reactor 116 configured to transmit electrical power from first layer of housing 160 to third layer of housing 160, wherein continuous conductor may travel from first layer of housing 160 to third layer of housing 160 through second layer of housing 160 externally. For another instance, and without limitation, at least a fluid outlet 148 of injector 140 may be mechanically fixed to the bottom of second layer or top of third layer of housing 160, wherein the at least a fluid outlet 148 may include a first end connected to injector 140 and a second end extended into third layer of housing 160 that incorporates plasma reactor 116. In such embodiment, at least a fluid contained within at least a reservoir 112 may be introduced into plasma reactor 116 and further through reaction region 128 from second layer of housing 160 to third layer of housing 160. Additionally, or alternatively, housing 160 may include a proper insulation of the electrode wire (continuous conductor 136) configured to prevent electrical shorts or interference with other components in housing 160. In a non-limiting example, an insulator may be used at a point where continuous conductor 136 passes through housing 160, as described in further detail with reference to FIG. 2.

Figure 2:
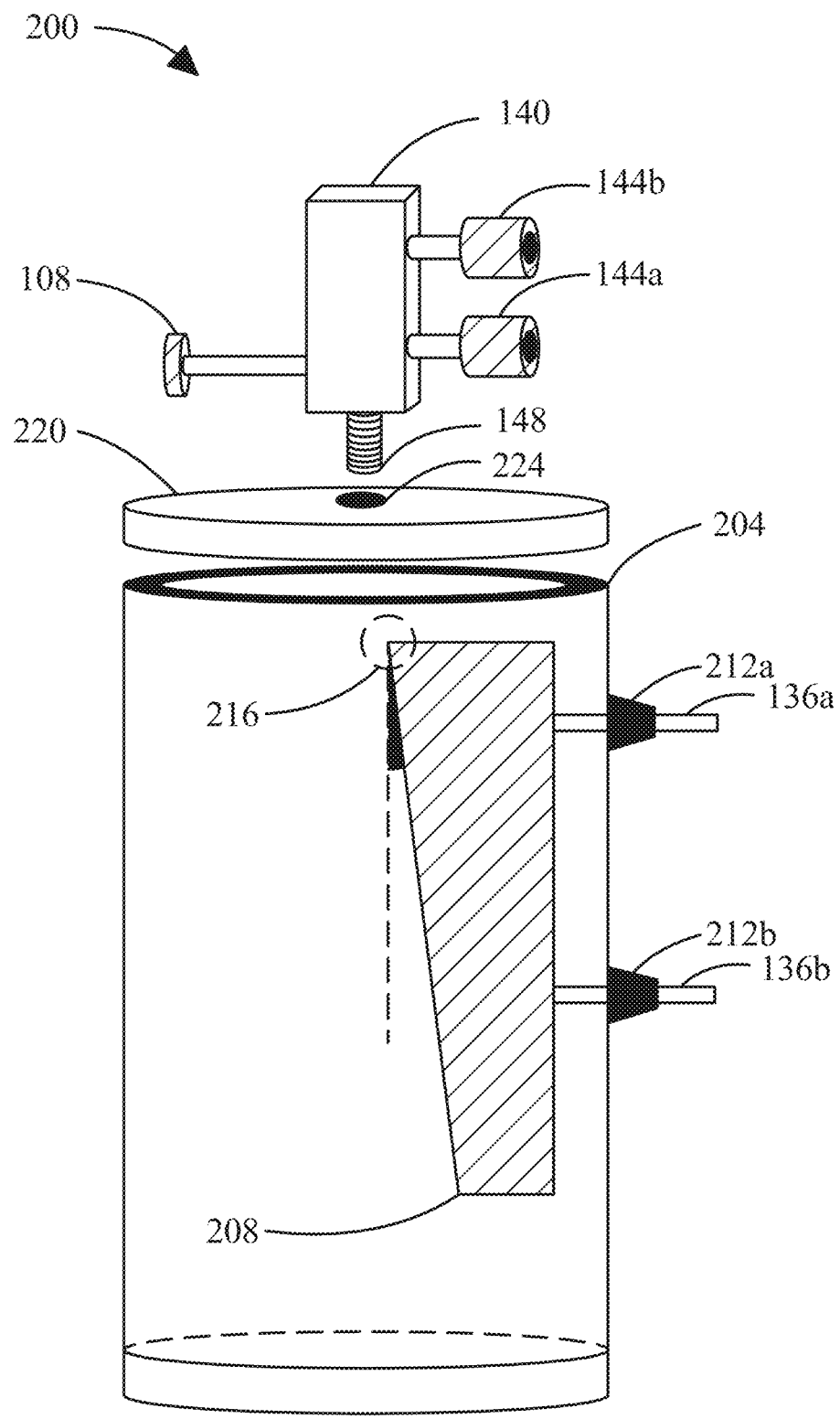
FIG. 2 is an exemplary embodiment of a plasma reactor assembly.

Now referring to FIG. 2, an exemplary FIG. 2 is an exemplary embodiment of a plasma reactor assembly 200. Plasma reactor assembly 200 may include a housing 204. In an embodiment, housing 204 may be a portion of housing 160 as described above. In another embodiment, housing 204 may be a separate housing configured to only house plasma reactor 116. In a non-limiting example, plasma reactor 116 may be double-housed, wherein housing 204 may be disposed within third layer of housing 160 as illustrated in FIG. 1. At least a pair of electrodes 120a-b and reaction region 128 in between electrodes of at least a pair of electrodes 120a-b may be disposed within housing 204. In some cases, housing 204 may be injection molded via an injectable mold. As used in this disclosure, an "injectable mold" is a manufacturing tool for producing plastic parts. Manufacturing housing 204 may include using an injection molding process, wherein the injection molding process may involve a use of injectable mold configured to create specific shape and features of housing 204. In some embodiments, injectable mold may include two halves that are clamped together, with one or more cavities in between, wherein the cavities may define the shape of housing 204. In some cases, material such as, without limitation, molten plastic may be injected into the injectable mold under high pressure, filling the space and taking on the shape of injectable mold. Injection molding process may include a cooling process which is configured to cool and/or solidify injected material. Injectable mold may be then opened and finished housing 204 may be removed. In some embodiments, injectable mold may be precisely machined to desired shape and size of housing 204. In a non-limiting example, housing 204 may include a hollow cylinder.

With continued reference to FIG. 1, one or more continuous conductor 136a-b may pass through housing 204, with one end electrically connected to at least an electrode 208 of at least a pair of electrodes 120a-b. In some cases, at least an electrode 208 may include a first electrode 120a. In other cases, at least an electrode 208 may include second electrode 120b. Another end of continuous conductor 136a-b may be connected to ignition unit 132 or ground 124 as described above with reference to FIG. 1. In some embodiments, one or more insulators 212a-b may be used at the point where continuous conductor 136a-b passes through housing 204. An "insulator," for the purpose of this disclosure, is a material that does not readily conduct heat, electricity, or sound. In a non-limiting example, insulators 212a-b may include electrical insulators, wherein the electrical insulators are material that have high electrical resistivity. Electrical insulators may not readily conduct electric current, thereby preventing the flow of electricity between plasma reactor 116 with other components except ignition unit 132, reducing the risk of short circuits, electrical shocks, interference, and the like. Exemplary electrical insulator may include plastics, ceramics, glass, rubber, and the like.

With continued reference to FIG. 2, each electrode of at least a pair of electrodes 120a-b may include a pitch angle 216. In a non-limiting example, at least an electrode 208 may include a pitch angle 216 of 12 degrees. As used in this disclosure, a "pitch angle" of an electrode refers to an angle between the electrode's longitudinal axis and a reference plane or axis within plasma reactor 116. In an embodiment, the cone shape of the injector discharge may be between 12 degrees and 15 degrees and the pitch angle of the electrode 208 may be between 6 degrees and 8 degrees. In an embodiment, the injector pitch may match the electrode 208 or vice versa. In some cases, pitch angle 216 may impact on characteristics of plasma generated between electrodes in reaction region 128 such as, without limitation, electric field distribution, efficiency of electrical discharge process, interaction with reactive species (e.g., ROS, RNS, and the like) within the plasma.

With continued reference to FIG. 2, injector 140 may be connected to plasma reactor 116 via an injector mount flange 220. As used in this disclosure, an "injector mount flange" is a mechanical component used to securely attach injector 140 to housing 204 in a reliable and leak-proof manner. In a non-limiting example, injector mount flange 220 may include an interface 224 between injector 140 and plasma reactor 116. In some cases, at least a fluid outlet 148 of injector 140 may include a threaded adaptor. Both at least a fluid outlet 148 and interface 224 may include a threaded section; for instance, and without limitation, at least a fluid outlet 148/interface 224 may include a male/female threaded section, wherein the male and the female threaded section are compatible (i.e., matched). Injector 140 may be threaded, via at least a fluid outlet 148 with threaded adaptor onto injector mount flange 220 at interface 224. In an embodiment, the bottom of the injector 140 may be a fluid outlet 148 having an opening at the bottom which allows the gas and water to exit in a controlled spray cone. The outside of the fluid outlet 148 may be threaded. The mount flange 220 may feature an interface 224 with matching threads in the center of it allowing for the injector 140 to securely connect to it. In an embodiment, the position of the fluid outlet 148 in the mount flange 220 may allow for the release of the gas and water to exit directly into the center of the reaction region 128.

Figure 3:
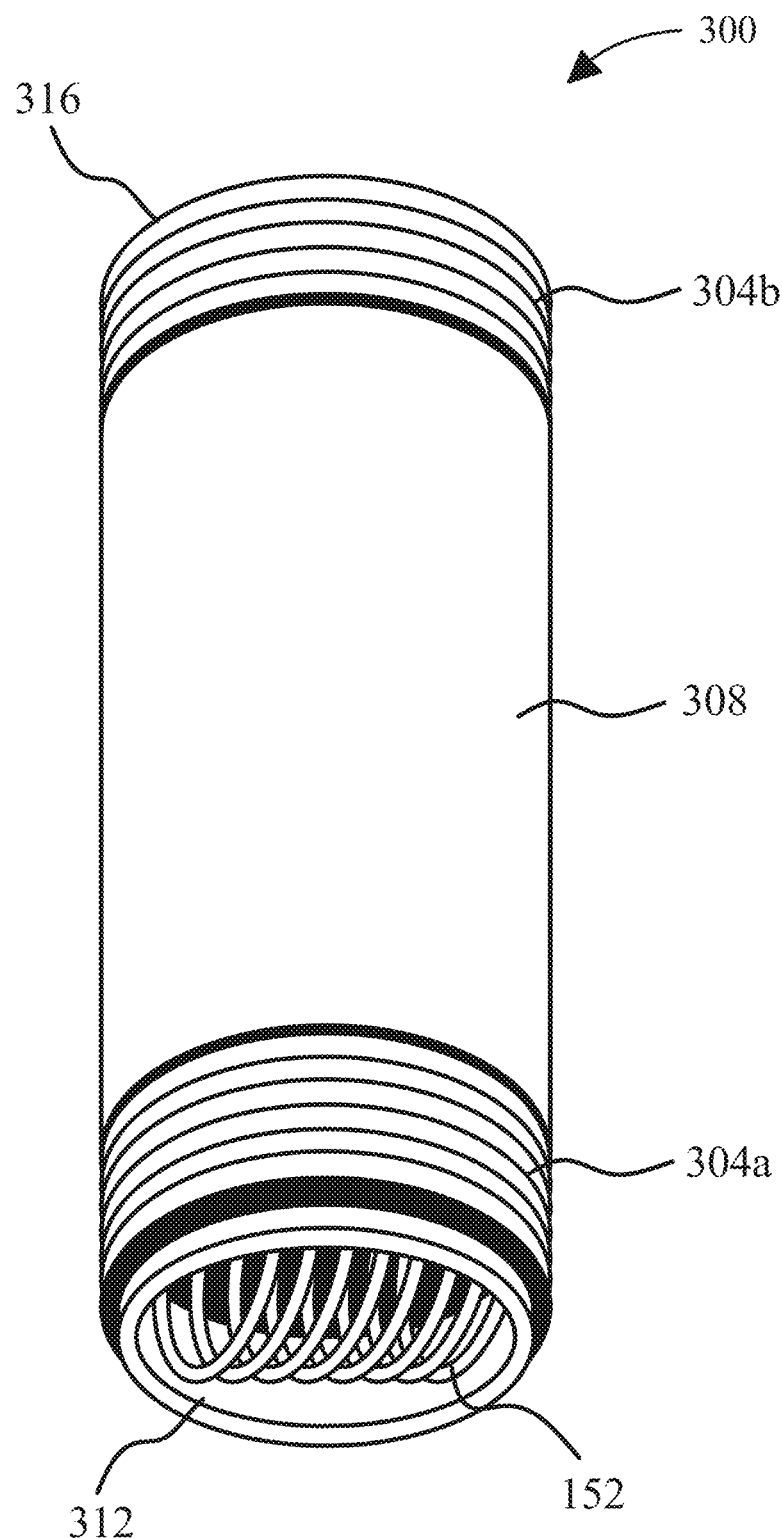
FIG. 3 is an exemplary embodiment of a segment of conduit.

Now referring to FIG. 3, an exemplary embodiment of a segment of conduit 300 is illustrated. Conduit 300 may include any conduit as described above with reference to FIG. 1. In some embodiments, conduit 300 may include a pipe that allows for the flow of fluids such as gases or liquids, from one part of the condenser 152 to another or from the condenser 152 to another component of apparatus 100. In some cases, conduit of condenser 152 may include a plurality of segments of conduit, wherein the plurality of segments of conduit are connected with each other. In a non-limiting example, a plurality of short conduit segments may be connected to form a long conduit within condenser 152 to provide a longer passageway for fluids. In some cases, connection between two segments of conduit may be established through a mechanical interface. In a non-limiting example, segment of conduit 300 may include a body 308, a first mechanical interface 304a, and a second mechanical interface 304b, wherein the first mechanical interface 304a may be connected with a first segment of conduit at a proximal end 312 of the body 308 and the second mechanical interface 304b may be connected with a second segment of conduit at a distal end 316 of body 308. In some cases, mechanical interface may include a swivel joint, wherein the "swivel joint," as used herein, is a mechanical device used to join two or more components, such as segments of conduit, in a manner that allows for rotational movement along a connection axis. Swivel joint may be designed to withstand the pressure exerted by the flowing fluid and the mechanical stresses caused by the rotation. Connected segment of conduit such as first segment of conduit and second segment of conduit may include a matching profiles that allow for assembly and secure connection at their corresponding end. In some cases, proximal end 312 may include an outlet for flow fluids while distal end 316 may include an inlet for flow fluids or vice versa. Other exemplary mechanical interface may include, without limitation, elbow joint, tree joint, cross joint, union joint, coupling joint, reducer joint, flange joint, and/or the like.

Still referring to FIG. 3, in some cases, condenser 152 may be disposed inside conduit. In an embodiment, condenser 152 may not be an external component but is integrated within conduit itself. In some cases, condenser 152 may be constructed from thermally conductive materials such as, without limitation, copper, or aluminum. In a non-limiting example, condenser 152 may include a stainless steel wool and configured to allow fluid such as, without limitation, water vapor, to condense back into droplets of water as described herein. In such embodiments, conduit may serve not only as a pathway for fluid flow but also as a containment vessel for condenser 152 and as a secondary pathway for heat dissipation.

Figure 4:
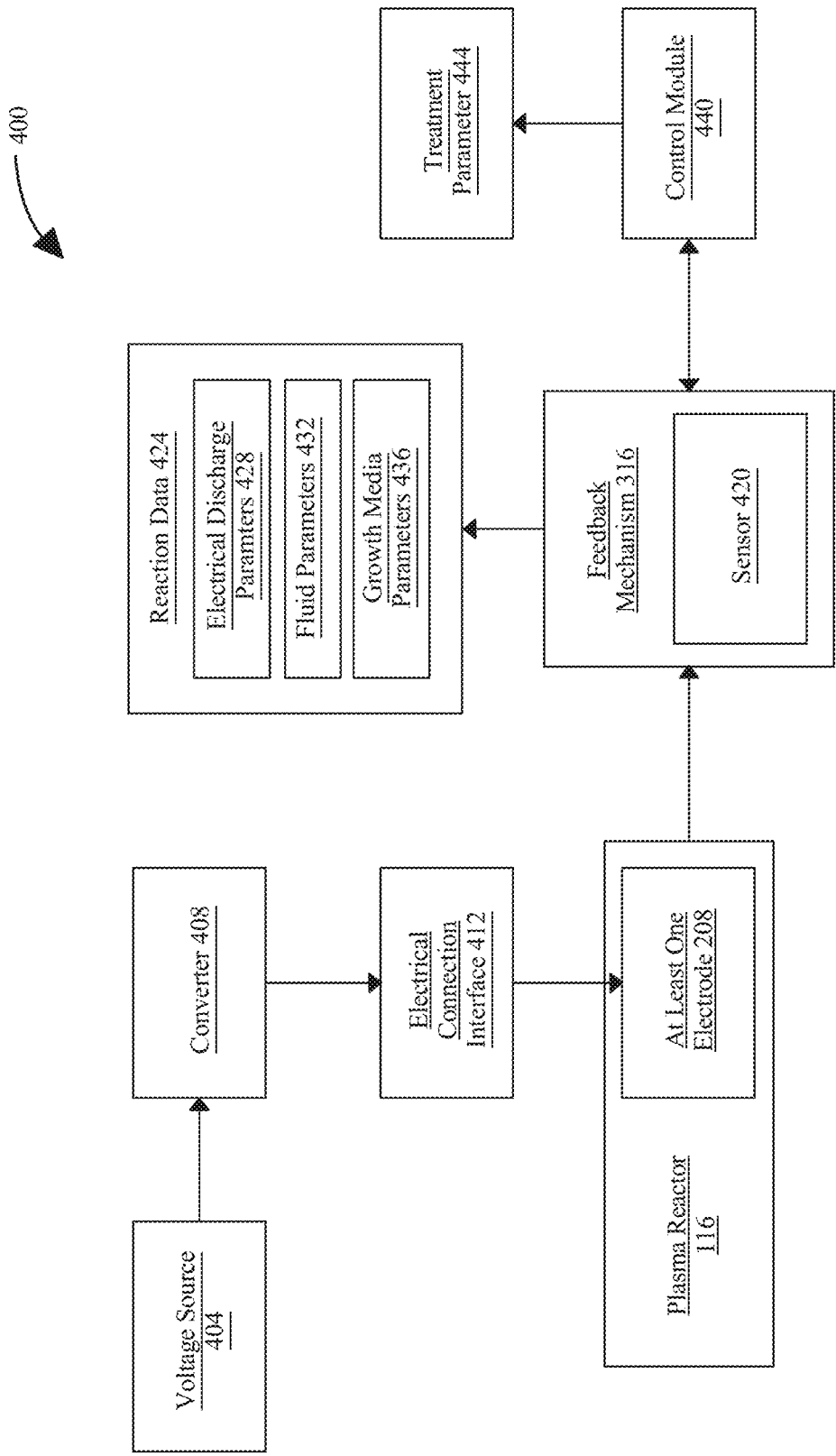
FIG. 4 is an exemplary embodiment of an ignition unit.

Now referring to FIG. 4, an exemplary embodiment of an ignition unit 132 is illustrated. Ignition unit includes a voltage source 404. As used in this disclosure, a "voltage source" is an electrical device that provides a stable and continuous electrical potential difference (i.e., voltage) between two points in an electrical circuit. In some embodiments, voltage source 404 may supply the energy required for the operation of various circuit, devices, and/or components in apparatus 100. In a non-limiting example, ignition unit 132 may include an ignition circuit, wherein the ignition circuit is an electrical system/circuit that is used to initiate the formation of plasma in plasma reactor 116 as described above with reference to FIGS. 1-2. Voltage source 404 connected within ignition circuit may provide the electrical energy required for generating and/or maintaining electrical discharge between at least a pair of electrodes 120a-b within reaction region 128. In an embodiment, voltage source 404 may include an AC power supply, wherein the alternating current (AC) power supply may provide a sinusoidal or non-sinusoidal waveform with a specific frequency, amplitude, and/or phase angle. In another embodiment, voltage source 404 may include a direct current (DC) power supply, wherein the DC power supply may provide a constant voltage level. In a further non-limiting example, voltage source 404 may include one or more batteries; for instance, and without limitation, ignition unit 132 may include a portable or standalone ignition unit, wherein the batteries may store electrical energy in the form of chemical energy and convert it to electrical energy when required. In some cases, batteries may include, without limitation, lead-acid batteries, lithium-ion batteries, nickel-metal hydride batteries, and the like.

With continued reference to FIG. 4, ignition unit 132 includes a converter 408. As used in this disclosure, a "converter" is an electrical component that transforms electrical energy from one waveform to another. In some cases, converter 408 may modify properties of electrical energy such as, without limitation, voltage, current, waveform, and/or the like. In an embodiment, converter 408 is configured to convert electrical voltage from a DC voltage input to an AC voltage output. In some cases, electrical discharges may be generated and sustained more effectively using AC rather than DC; for instance, and without limitation, AC voltage oscillates between first electrode 120*a* and second electrode 120*b* may help plasma reactor 116 in ionizing at least a fluid injected, maintaining the plasma, and/or preventing the build-up of charges on at least a pair of electrodes 120*a*-*b*. In a non-limiting example, converter 408 may include an DC to AC converter, wherein the DC to AC converter may convert DC voltage input to AC voltage output with specific waveform, frequency, and/or amplitude. In an embodiment, convertor 408 may also convert AC to AC. For example, AC to AC converters may be used for converting the AC waveforms with one particular frequency and magnitude to AC waveform with another frequency at another magnitude. For example, an AC voltage controller may be a thyristor-based device which converts fixed alternating voltage directly to variable alternating voltage without a change in frequency. AC voltage controller may be a phase-controlled device and hence no force commutation circuitry may be required and natural or line commutation may be used. In such an embodiment, converter may include an inverter. In a non-limiting example, converter 408 may include a switching circuit, wherein the switching circuit is an electrical circuit that is designed to rapidly turn a device on and off in order to control the flow of current or voltage through the circuit. Switching circuit may generate a series of square-wave pulses that approximate the shape of AC waveform; for instance, and without limitation, converter 408 may convert DC and/or AC voltage input to a pulsed output such as a symmetrical or asymmetrical square wave, a pulse train, and/or any other wave form including a triangular sawtooth, or other waveform. In some cases, frequency of square-wave pulses may be determined by an oscillator circuit, wherein the oscillator circuit is an electrical circuit that generates a periodic signal or waveform (e.g., sine wave, square wave, and the like). In some cases, converter 408 may use an electronic circuit to modify frequency of periodic signal; for instance, and without limitation, converter 408 may include a frequency multiplier, a frequency divider, a frequency mixer, a phase-locked loops (PLLs), and/or the like to increase or decrease the frequency of periodic signal.

Still referring to FIG. 4, converter 408 may include a transformer. A "transformer," for the purpose of this disclosure, is an electrical device that is used to transfer electrical energy from a first circuit to a second circuit via electromagnetic induction. In an embodiment, transformer may be used to increase or decrease voltage of AC power supply, to isolate circuits from each other, and/or to match impedance of a load to a source. In a non-limiting example, transformer may include ignition transformer as described above with reference to FIG. 1. Additionally, or alternatively, switching circuit may include one or more solid-state devices such as, without limitation, power MOSFETs, IGBTs, thyristors, and/or the like to control the flow of current through the circuit. In a non-limiting example, switching circuit may be controlled; for instance, solid-state devices within switching circuit may be turned on and off, by control module that monitors or controls the output voltage and current of converter 408 as described in further detail below. In some embodiments, converter 408 may be configured to the DC voltage input to a high-voltage discharge at 10,000 kHz (10 MHz). Converter 408 configured to convert DC voltage input to AC voltage output may be implemented using various circuit topologies, such as, without limitation, H-bridge, full-bridge, or half-bridge configurations, and may incorporate pulse-width modulation (PWM) techniques for voltage and frequency control.

With continued reference to FIG. 4, ignition unit 132 may include a dielectric barrier discharge (DBD) operation. As used in this disclosure, a "dielectric barrier discharge (DBD)" is a type of plasma discharge that occurs between two electrodes separated by a dielectric material. In some cases, dielectric material may act as an insulator 212*a*-*b* as described above, preventing the direct flow of current between at least a pair of electrodes. In a non-limiting example, DBD operation may include applying high voltage, provided by voltage source 404 and converted through converter 408, to at least a pair of electrodes 120*a*-*b*, wherein first electrode 120*a* and/or second electrode 120*b* of least a pair of electrodes 120*a*-*b* may be insulated by a dielectric. Dielectric material may include, without limitation, quartz, ceramic, glass, and the like. Instead of plurality of points of arc, a plurality of fine plasma filaments may be formed between at least a pair of electrodes 120*a*-*b*, wherein plurality of fine plasma filaments may only have a very short lifetime in the range of a few nanoseconds. In some embodiments, DBD may be a non-thermal (cold) plasma due to such low lifetime of DBD, wherein the heavy particles may absorb far less energy from the alternating field than lighter and faster electrons. In some embodiments, DBD operation may be operated at atmospheric pressure via pressure regulation system as described above with reference to FIG. 1.

With continued reference to FIG. 4, in some embodiments, converter 408 may be capable of converting AC voltage input into DC voltage output. In some cases, ignition unit 132 may need to convert AC to DC power supply in order for apparatus 100 to perform a pulsed operation. During the pulse plasma operation, plasma reactor 116 may operate in a pulsed mode, where the plasma may be generated and sustained for short periods followed by a period of no electrical discharge. DC power supply may be easily controlled and switched on and off as required, thereby making it suitable for pulsed plasma operation. In some cases, apparatus 100 may convert AC to DC power supply to reduce electrode wear and contamination; for instance, and without limitation, in AC-powered plasma reactor 116, the constantly changing polarity of electrodes may lead to accelerated electrode wear and the release of electrode material into the generated plasma. By using a DC power supply, the electrodes may maintain a constant polarity, reducing wear and contamination and increasing lifetime of the electrodes. In a non-limiting example, ignition unit 132 may include a rectifier. As used in this disclosure, a "rectifier" is an electrical device or circuit that converts AC to DC. Rectifier may be built using one or more diodes, wherein the diodes are semiconductor devices that allow electrical current to flow in only one direction and have a low resistance to electrical current flow in the forward direction (when electrical voltage is positive) and a high resistance to electrical current flow in the reverse direction (when electrical voltage is negative). In some cases, rectifier may include, without limitation, half-wave rectifier, full-wave rectifier, and the like.

With continued reference to FIG. 4, ignition unit 132 includes an electrical connection interface 412 configured to electrically connect converter 408 to at least one electrode of at least a pair of electrodes 120*a*-*b* disposed in plasma reactor 116. As used in this disclosure, an "electrical connection interface" is a physical and electrical arrangement that enables the transfer of electrical energy or signals between two or more devices and/or components. In a non-limiting example, electrical connection interface 412 may establish an electrical connection between voltage source 404/converter 408 and at least one electrode of at least a pair of electrodes 120*a-b*. Such an electrical connection may allow current to flow (i.e., AC voltage output) between voltage source 404/converter 408 and at least one electrode of at least a pair of electrodes 120*a-b*. In a non-limiting example, electrical connection interface 412 may include an electrical connector, wherein the electrical connector is an electromechanical device used to create electrical connection. In some embodiments, electrical connection interface 412 may include a gender; for instance, and without limitation, electrical connection interface 412 may include a male component connects to a female component. In a non-limiting example, at least one electrode may include a screw terminal, wherein screw terminal may allow one end of continuous conductor 136 to be attached by tightening a screw. Another end of continuous conductor 136 may include a male component such as a plug, may be connected to a female component located on ignition unit 132 such as a socket. Other exemplary embodiment of electrical connection interfaces 412 may include, without limitation, a cable, a terminal, connectors, wire-to-board/board-to-board connections, and the like.

With continued reference to FIG. 4, ignition circuit includes a feedback mechanism 416. Feedback mechanism 416 includes a sensor 420 configured to detect reaction data 424. As used in this disclosure, "reaction data" are information related to reactions that occurred in reaction region 128 of plasma reactor 116 and processes or operations of apparatus 100 that initiated, caused, or otherwise maintained the reactions. In some cases, reactions may include, without limitation, electrical discharge generation, plasma generation, and/or any chemical reactions as described above in this disclosure. In an embodiment, reaction data 424 may include a plurality of electrical discharge parameters 428. "Electrical discharge parameters," for the purpose of this disclosure, are measurable properties or characteristics of electrical discharge process (i.e., plasma generation, electrical arcing, and the like). In a non-limiting example, electrical discharge parameters 428 may include, without limitation, electrical voltage, electrical current, discharge frequency, waveform, phase angle, and the like thereof. In another embodiment, reaction data 424 may include a plurality of fluid parameters 432. "Fluid parameters," for the purpose of this disclosure, are measurable properties or characteristics of a fluid (i.e., first fluid and/or second fluid) involved in the treatment process. In a non-limiting example, fluid parameters 432 may include, without limitation, flow rate, pressure, fluid temperature, fluid viscosity, fluid density, fluid turbidity or clarity, and the like. In a further embodiment, reaction data 424 may include a plurality of growth medium parameters 436. "Growth medium parameters," for the purpose of this disclosure, are measurable properties or characteristics of growth medium contained in treatment chamber 108 during the treatment process. In a non-limiting example, growth medium parameters 436 may include, without limitation, light properties, temperature of growth medium, humidity level within treatment chamber 108, optical properties of the growth medium (e.g., growth, absorption, reflectance, transmittance, etc.), and the like.

With continued reference to FIG. 4, as used in this disclosure, a "feedback mechanism" is a system that provides information (i.e., reaction data 424 as listed above) about the output, outcome, or otherwise performance of a device, component, or system back to a control element (i.e., control module as described below). In an embodiment, feedback mechanism 416 may include a negative feedback mechanism, wherein reaction data 424 provided by feedback loop may be used to counteract/oppose the change in system's output or apparatus operation. In such an embodiment, feedback mechanism 416 may maintain apparatus performance within a desired range or setpoint, event in the presence of disturbances or changes in operating conditions. In another embodiment, feedback mechanism 416 may include a positive feedback mechanism, wherein reaction data 424 provided by feedback loop may be used to amplify/reinforce the change in system's output or apparatus operation. In such embodiment, feedback mechanism 416 may lead to rapid changes or exponential growth in system's behavior such as, without limitation, amplification of signals electrical circuits within apparatus 100.

With continued reference to FIG. 4, as used in this disclosure, a "sensor" is a device that detects, measure, or otherwise convert a physical, chemical, or environmental property into an electrical signal, which can be processed and/or analyzed by device/system feedback mechanism 416 connected to. In some embodiments, sensor 420 may include at least one sensor selected from plurality of sensors consisting of a voltage sensor, a moisture sensor, a temperature sensor, and an optical sensor. As used in this disclosure, a "voltage sensor" is a device configured to measure the different ranges of voltage (mV~kV) between two points in an electrical circuit. In some cases, voltage sensor may operate at different frequencies, from DC to high-frequency AC; for instance, and without limitation, voltage sensor may be configured to measure either AC and/or DC voltage. In a non-limiting example, voltage sensor may be connected across electrodes of at least a pair of electrodes 120*a-b* or within reaction region 128 to continuously monitor the voltage levels. Such voltage sensor may include a high-voltage probe with a resistive divider.

With continued reference to FIG. 4. as used in this disclosure, a "moisture sensor" is a device configured to detect the amount of moisture present in a material, or a space, such as, without limitation, treatment chamber 108 connected to plasma reactor 116. Moisture sensor may be employed by feedback mechanism 416 to monitor the moisture content or humidity of growth medium or treatment chamber 108. In a non-limiting embodiment, moisture sensor may include a capacitive moisture sensor, wherein the capacitive moisture sensor is a type of moisture sensor that works by measuring a capacitance of a sensing element, wherein the sensing element is a thin film or a hygroscopic material such as, without limitation, a polymer or metal oxide, which absorbs or releases fluid molecules based on the surrounding humidity. Capacitive moisture sensor may include two electrodes separated by the sensing element, thereby forming a capacitor. When sensing element contains moisture, the capacitance of capacitive moisture sensor may change, as molecules of at least a fluid in the material increases effective area of electrodes. In a non-limiting example, sensor 420 may determine a moisture level of treatment chamber 108 by measuring the change in capacitance of capacitive moisture sensor. Additionally, or alternatively, in another non-limiting embodiment, moisture sensor may include a resistance moisture sensor, wherein the resistance moisture sensor is a type of moisture sensor that works by measuring electrical resistance of sensing element in a similar manner. In a non-limiting example, electrical current may be passed through sensing element, and the voltage drop across electrodes may be measured. Resistance may be calculated based on Ohm's law. Sensor 420 may then determine moisture level as a function of the calculated resistance of sensing element.

With continued reference to FIG. 1, as used in this disclosure, a "temperature sensor" is a device configured to measure temperature of other devices/components within apparatus 100. In a non-limiting example, sensor 420 may include, without limitation, thermocouples, thermistors, thermometers, passive infrared sensors, resistance temperature sensors (RTD's), semiconductor based integrated circuits (IC), a combination thereof or another undisclosed sensor type, alone or in combination. "Temperature," for the purposes of this disclosure, and as would be appreciated by someone of ordinary skill in the art, is a measure of the heat energy of a system. Temperature, as measured by temperature sensor, may be measured in Fahrenheit (° F.), Celsius (° C.), Kelvin (° K.), or another scale alone or in combination. In some embodiments, sensor 420 may be configured to measure the temperature of ignition unit 132, plasma reactor 116, and/or treatment chamber 108 during treatment process using temperature sensor. In other embodiments, temperature sensor may be configured to measure the temperature of surrounding environment of apparatus 100.

With continued reference to FIG. 1, in a further embodiment, sensor 420 may include an optical device. As used in this disclosure, an "optical device" is any device that generates, transmits, detects, or otherwise functions using electromagnetic radiation, including without limitation ultra-violet light, visible light, near infrared light, infrared light, and the like. In some embodiments, optical device may include one or more waveguide. As used in this disclosure, a "waveguide" is a component that is configured to propagate electromagnetic radiation, including without limitation ultra-violet light, visible light, near infrared light, infrared light, and the like. A waveguide may include a lightguide, a fiberoptic, or the like. A waveguide may include a grating within a transmissive material. In some cases, a waveguide may be configured to function as one or more optical devices, for example a resonator (e.g., microring resonator), an interferometer, or the like. In some cases, waveguide may be configured to propagate electromagnetic radiation (EMR). In a non-limiting example, sensor 420 may include a sensor, wherein the sensor may be optical communication with one or more waveguide. Such sensor may be configured to detect a variance in at least an optical property associated with growth medium 104. As used in this disclosure, an "optical property" is any detectable characteristic associated with electromagnetic radiation, for instance UV, visible light, infrared, and the like.

With continued reference to FIG. 1, in some embodiments, sensor 420 may include at least a photodetector. In some cases, sensor 420 may include a plurality of photodetectors, for instance at least a first photodetector and at least a second photodetector. In some cases, at least a first photodetector and/or at least a second photodetector may be configured to measure one or more of first optical output and second optical output, from a first waveguide and a second waveguide, respectively. As used in this disclosure, a "photodetector" is any device that is sensitive to light and thereby able to detect light. In some cases, a photodetector may include a photodiode, a photoresistor, a photosensor, a photovoltaic chip, and the like. In some cases, photodetector may include a Germanium-based photodiode. Light detectors may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. Avalanche Photo Diodes (APDs), as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs provide a built-in stage of gain through avalanche multiplication. When the reverse bias is less than the breakdown voltage, the gain of the APD is approximately linear. For silicon APDs this gain is on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. At least a first photodetector may be configured to generate a first signal as a function of variance of an optical property of the first waveguide, where the first signal may include without limitation any voltage and/or current waveform. Additionally, or alternatively, sensor device may include a second photodetector located down beam from a second waveguide. In some embodiments, second photodetector may be configured to measure a variance of an optical property of second waveguide and generate a second signal as a function of the variance of the optical property of the second waveguide.

With continued reference to FIG. 1, in some cases, photodetector may include a photosensor array, for example without limitation a one-dimensional array. Photosensor array may be configured to detect a variance in an optical property of waveguide. In some cases, first photodetector and/or second photodetector may be wavelength dependent. For instance, and without limitation, first photodetector and/or second photodetector may have a narrow range of wavelengths to which each of first photodetector and second photodetector are sensitive. As a further non-limiting example, each of first photodetector and second photodetector may be preceded by wavelength-specific optical filters such as bandpass filters and/or filter sets, or the like; in any case, a splitter may divide output from optical matrix multiplier as described below and provide it to each of first photodetector and second photodetector. Alternatively, or additionally, one or more optical elements may divide output from waveguide prior to provision to each of first photodetector and second photodetector, such that each of first photodetector and second photodetector receives a distinct wavelength and/or set of wavelengths. For example, and without limitation, in some cases a wavelength demultiplexer may be disposed between waveguides and first photodetector and/or second photodetector; and the wavelength demultiplexer may be configured to separate one or more lights or light arrays dependent upon wavelength. As used in this disclosure, a "wavelength demultiplexer" is a device that is configured to separate two or more wavelengths of light from a shared optical path. In some cases, a wavelength demultiplexer may include at least a dichroic beam splitter. In some cases, a wavelength demultiplexer may include any of a hot mirror, a cold mirror, a short-pass filter, a long pass filter, a notch filter, and the like. An exemplary wavelength demultiplexer may include part No. WDM-11P from OZ Optics of Ottawa, Ontario, Canada. Further examples of demultiplexers may include, without limitation, gratings, prisms, and/or any other devices and/or components for separating light by wavelengths that may occur to persons skilled in the art upon reviewing the entirety of this disclosure. In some cases, at least a photodetector may be communicative with computing device (i.e., by means of sensed signal) as described below in this disclosure.

With continued reference to FIG. 4, ignition unit 132 may include a control module 440 communicatively connected to feedback mechanism 416 configured to control various other components of ignition unit 132, such as, without limitation, voltage source 404, converter 408, feedback mechanism 416, and the like. Control module may include an analog or digital control circuit, or any combination thereof, such as an operational amplifier circuit, a transistor-based circuit, or other analog circuit, a combinational logic circuit using one or more gates, a synchronous or asynchronous sequential logic circuit using one or more registers, latches, or other state-preserving elements, a finite state machine, or the like. Control module 440 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Control module 440 may include a single computing device operating independently, or may include two or more computing device operating in concert, in parallel, sequentially or the like; two or more computing devices may be included together in a single computing device or in two or more computing devices. Control module 440 may interface or communicate with one or more additional devices as described below in further detail via a network interface device. Network interface device may be utilized for connecting control module 440 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Control module 440 may include but is not limited to, for example, a computing device or cluster of computing devices in a first location and a second computing device or cluster of computing devices in a second location. Control module 440 may include one or more computing devices dedicated to data storage, security, distribution of traffic for load balancing, and the like. Control module 440 may distribute one or more computing tasks as described below across a plurality of computing devices of computing device, which may operate in parallel, in series, redundantly, or in any other manner used for distribution of tasks or memory between computing devices. Control module 440 may be implemented using a "shared nothing" architecture in which data is cached at the worker, in an embodiment, this may enable scalability of apparatus 100 and/or computing device.

With continued reference to FIG. 4, control module 440 may be designed and/or configured to perform any method, method step, or sequence of method steps in any embodiment described in this disclosure, in any order and with any degree of repetition. For instance, control module 440 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Control module 440 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 4, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 4, in some embodiments, internal components of apparatus 100 may be in communication with the control module 440 using one or more signals. As used in this disclosure, a "signal" is a human-intelligible and/or machine-readable representation of data, for example and without limitation an electrical and/or digital signal from one device to another; signals may be passed using any suitable communicative connection. A signal may include an optical signal, a hydraulic signal, a pneumatic signal, a mechanical signal, an electric signal, a digital signal, an analog signal, and the like. In some cases, a signal may be used to communicate with a control module 440, for example by way of one or more ports. In some cases, a signal may be transmitted and/or received by control module 440, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation feedback mechanism 416 and control module 440. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With further reference to FIG. 4, in some cases, control module 440 may perform one or more signal processing steps on a signal. For instance, control module 440 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, phase-locked loops, and/or any other process using operational amplifiers or other analog circuit elements. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 4, control module 440 is configured to initiate a generation of electrical discharge in reaction region 128 disposed between first electrode 120a and the second electrode 120b as a function of AC voltage output. Control module 440 may regulate electrical voltage provided by voltage source 404. In a non-limiting example, control module 440 may apply AC voltage output converted by converter 408 from converter 408 to at least one electrode of at least a pair of electrodes 120a-b. An AC electric field may be established between first electrode 120a and second electrode 120b in reaction region 128. When AC electric field becomes strong enough, electrical discharge may ionize at least a fluid passing through reaction region 128, thereby creating electrical discharge. Reaction region 128 is then configured to enable an interaction between electrical discharge and growth medium 104. Control module 440 may receive reaction data 424 detected by sensor 420 within feedback mechanism 416 during interaction between electrical discharge and growth medium 104. Reaction data 424 may include any reaction data as described in this disclosure, such as, without limitation, plurality of electrical discharge parameters 428, fluid parameters 432, growth medium parameters 436, and the like. Feedback mechanism 416 may provide such reaction data 424 to control module 440. Control module 440 may process reaction data 424 and adjust the operations of ignition unit 123 accordingly as described in further detail below to maintain optimal discharge conditions and achieve the desired treatment effects.

With continued reference to FIG. 4, in an embodiment, control module 440 may adjust at least a treatment parameter 444 of apparatus 100 as a function of reaction data 424. As used in this disclosure, a "treatment parameter" is operating parameters configured to optimize the treatment process based on the information (e.g., reaction data 424) received from feedback mechanism 416 as described above. In an embodiment, treatment parameter 444 may include an AC electrical voltage; for instance, and without limitation, control module 440 may adjust the amplitude of AC electrical voltage supplied to at least an electrode of at least a pair of electrodes 120a-b, wherein the AC electrical voltage may affect the intensity of electrical discharge and the energy transferred to the plasma. In another embodiment, treatment parameter 444 may include an AC frequency; for instance, and without limitation, control module 440 may change the AC frequency of the AC electrical voltage, wherein AC frequency may influence the generation of specific plasma species or the rate of chemical reactions. In a further embodiment, treatment parameter 444 may include a pulse width, wherein the pulse width refers to a duration or time interval during which a pulse signal is in its "on" state. In a non-limiting example, ignition unit 132 may include a pulse-width modulation to modulate the AC voltage provided by voltage source 404 or output by converter 408. Control module 440 may adjust pulse width of the modulated signal to control the AC voltage output to at least one electrode of at least a pair of electrodes 120a-b. In other embodiments, treatment parameter 444 may include a phase angle, wherein the phase angle describes a difference in timing or position between two wave forms with same the same frequency. In a non-limiting example, control module 440 may control phase angle between the electrical voltage and electrical current waveforms to optimize power transfer of ignition unit 132 and maintain a stable electrical discharge within plasma reaction 116. Other exemplary embodiments of treatment parameter 444 may include, without limitation, fluid flow rate of at least a fluid, fluid composition of at least a fluid, and the like.

Continuing to reference FIG. 4, control module 440 may use a machine learning module, to implement one or more algorithms or generate one or more machine-learning models, such as treatment machine learning model, to determine at least one treatment parameter 444. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user of apparatus 100. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine leaning module may be used to generate treatment machine learning model using training data. Treatment machine learning model may be trained by correlated inputs and outputs of training data. Training data may be data sets that have already been converted from raw data whether manually, by machine, or any other method. Training data may include previous outputs such that treatment machine learning model iteratively produces outputs. Treatment machine learning model using a machine-learning process may output converted data based on input of training data.

With continued reference to FIG. 4, in an embodiment, adjusting at least a treatment parameter 444 may include determining at least a treatment parameter 444 using a machine leaning model, such as treatment machine-learning model. Treatment machine learning model may be trained by training data, such as treatment training data. Determining at least a treatment parameter 444 based on the reaction data 424 using a machine learning model may include receiving user treatment training data. In an embodiment, treatment training data may include a plurality of reaction data 424 that are each correlated to at least a treatment parameter 444. In another embodiment, each element of reaction data 424 may correlated to a plurality of treatment parameters 444. For example, and without limitation, treatment training data may be used to show reaction data may indicate a particular treatment parameter 444. Control module may adjust treatment parameters 444 to ensure precise and effective treatment of growth medium 104 and optimizing the treatment process for desired outcomes. In an embodiment, treatment training data may include a plurality of electrical discharge parameters 428 that are each correlated to at least one treatment parameter 444. In such embodiment, treatment training data may be used to show how one or more electrical discharge parameters 428 may indicate one or more treatment parameters 444. In another embodiment, treatment training data may also include a plurality of fluid parameters 432 that are each correlated to at least one treatment parameter 444. In such an embodiment, treatment training data may be used to show how one or more fluid parameters 432 may indicate one or more treatment parameters 444. In a further embodiment, treatment training data may further include a plurality of growth medium parameters 436 that are each correlated to at least one treatment parameter 444. In such an embodiment, treatment training data may be used to show how one or more growth medium parameters 436 may indicate one or more treatment parameters 444. Determining at least one treatment parameter 444 using a machine learning model may further include training treatment machine learning model as a function of treatment training data and determining at least one treatment parameter 444 using trained treatment machine learning model.

Figure 5:
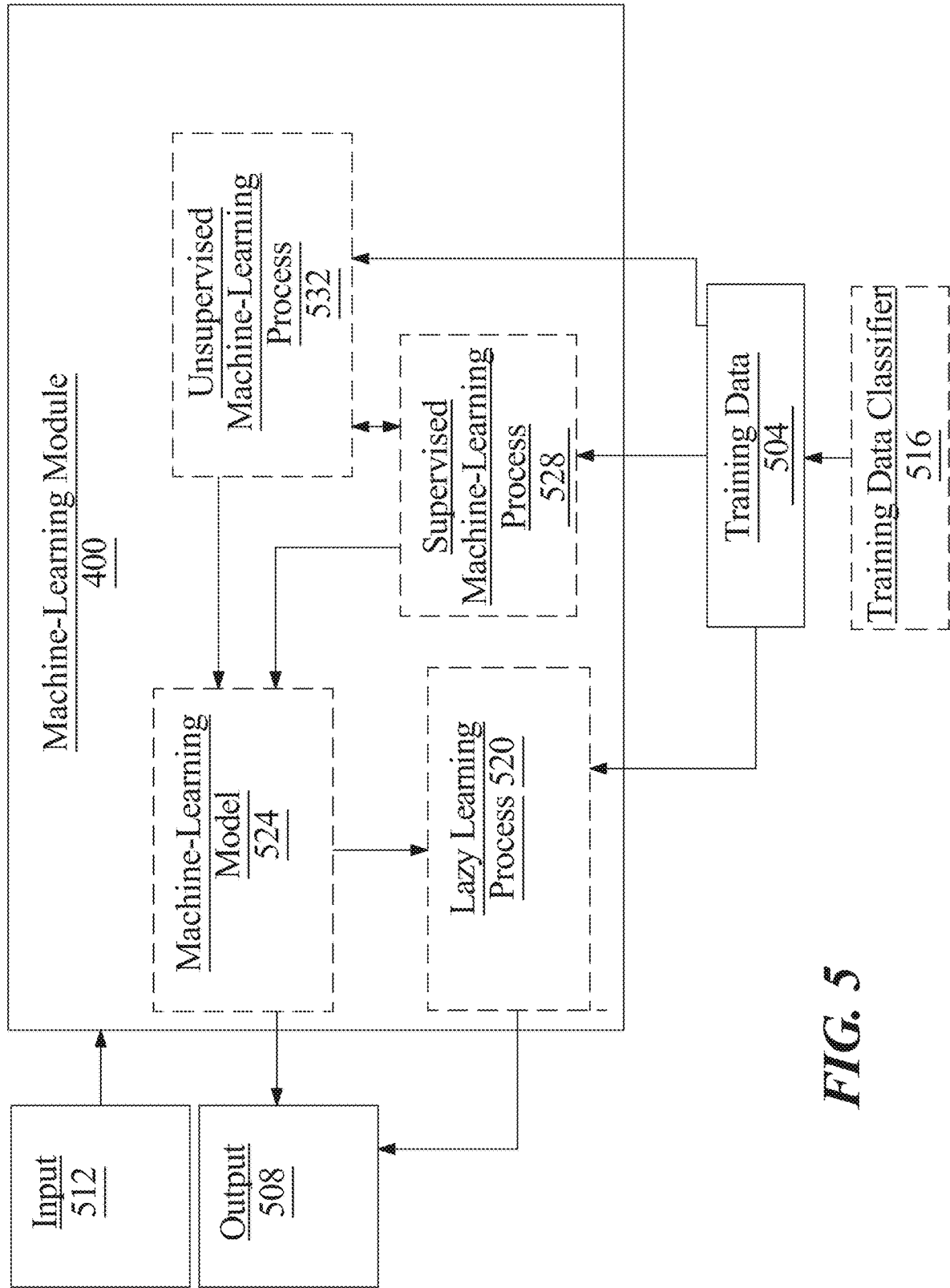
FIG. 5 is a block diagram of exemplary embodiment of a machine learning module in accordance with one or more embodiments of the present disclosure.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include reaction data as described above as inputs, at least a treatment parameter as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 6:
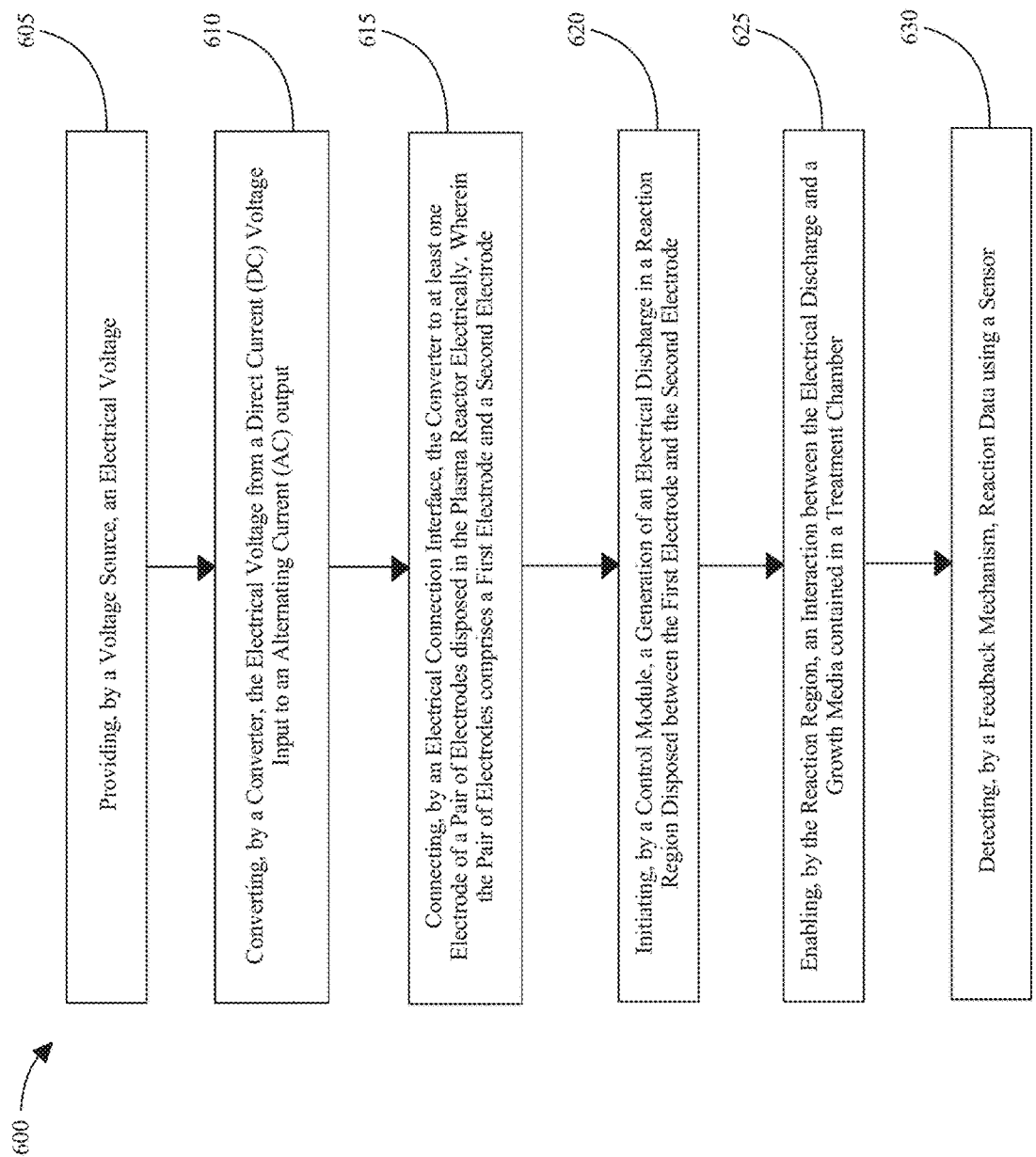
FIG. 6 is an exemplary embodiment of a method for treating a growth medium via an electrical discharge.

Now referring to FIG. 6, a flow diagram of an exemplary embodiment of a method 600 for treating a growth medium via an electrical discharge is illustrated. Method 600 includes step 605 of providing, by a voltage source, an electrical voltage. This may be implemented, without limitation, as described above in reference to FIGS. 1-5.

With continued reference to FIG. 6, method 600 includes step 610 of converting, by a converter, the electrical voltage from a direct current (DC) voltage input to an alternating current (AC) output. In some embodiments, the converter may be configured to the DC voltage input to a high-voltage discharge at 10,000 kHz (10 MHz). This may be implemented, without limitation, as described above in reference to FIGS. 1-5.

With continued reference to FIG. 6, method 600 includes a step 615 of connecting, by an electrical connection interface, the converter to at least one electrode of a pair of electrodes disposed in the plasma reactor electrically, wherein the pair of electrodes comprises a first electrode and a second electrode. In some embodiments, the first electrode of the at least a pair of electrodes may be configured to diverge from the second electrode of the at least a pair of electrodes. In some embodiments, each electrode of at least a pair of electrodes may include a pitch angle of 12 degrees. In some embodiments, at least one electrode of the pair of electrodes may include a dielectric insulation. This may be implemented, without limitation, as described above in reference to FIGS. 1-5.

With continued reference to FIG. 6, method 600 includes step 620 of initiating, by a control module, a generation of an electrical discharge in a reaction region disposed between the first electrode and the second electrode. In some embodiments, the reaction region may include a plurality of points of arc between the first electrode of the at least a pair of electrodes and the second electrode of the at least a pair of electrodes. This may be implemented, without limitation, as described above in reference to FIGS. 1-5.

With continued reference to FIG. 6, method 600 includes step 625 of enabling, by the reaction region, an interaction between the electrical discharge and a growth medium contained in the treatment chamber. This may be implemented, without limitation, as described above in reference to FIGS. 1-5.

With continued reference to FIG. 6, method 600 includes step 630 of detecting, by a feedback mechanism, reaction data using a sensor. In some embodiments, the sensor may include at least one sensor selected from a plurality of sensors consisting of a voltage sensor, a current sensor, a temperature sensor, a moisture sensor, and an optical sensor. In some embodiments, the reaction data may include a plurality of electrical discharge parameters, a plurality of fluid parameters, and a plurality of growth medium parameters. This may be implemented, without limitation, as described above in reference to FIGS. 1-5.

With continued reference to FIG. 6, method 600 may include steps of receiving, by the control module, the reaction data detected by the sensor from the feedback mechanism and adjusting, by the control module, at least a treatment parameter of the apparatus as a function of the reaction data. In some embodiment, adjusting the at least a treatment parameter may include training, by the control module, a treatment machine-learning model using treatment training data, wherein the treatment training data may include a plurality of reaction data as input correlated to a plurality of treatment parameters as output and determining, by the control module, at least a treatment parameter as a function of the trained treatment machine-learning model. This may be implemented, without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
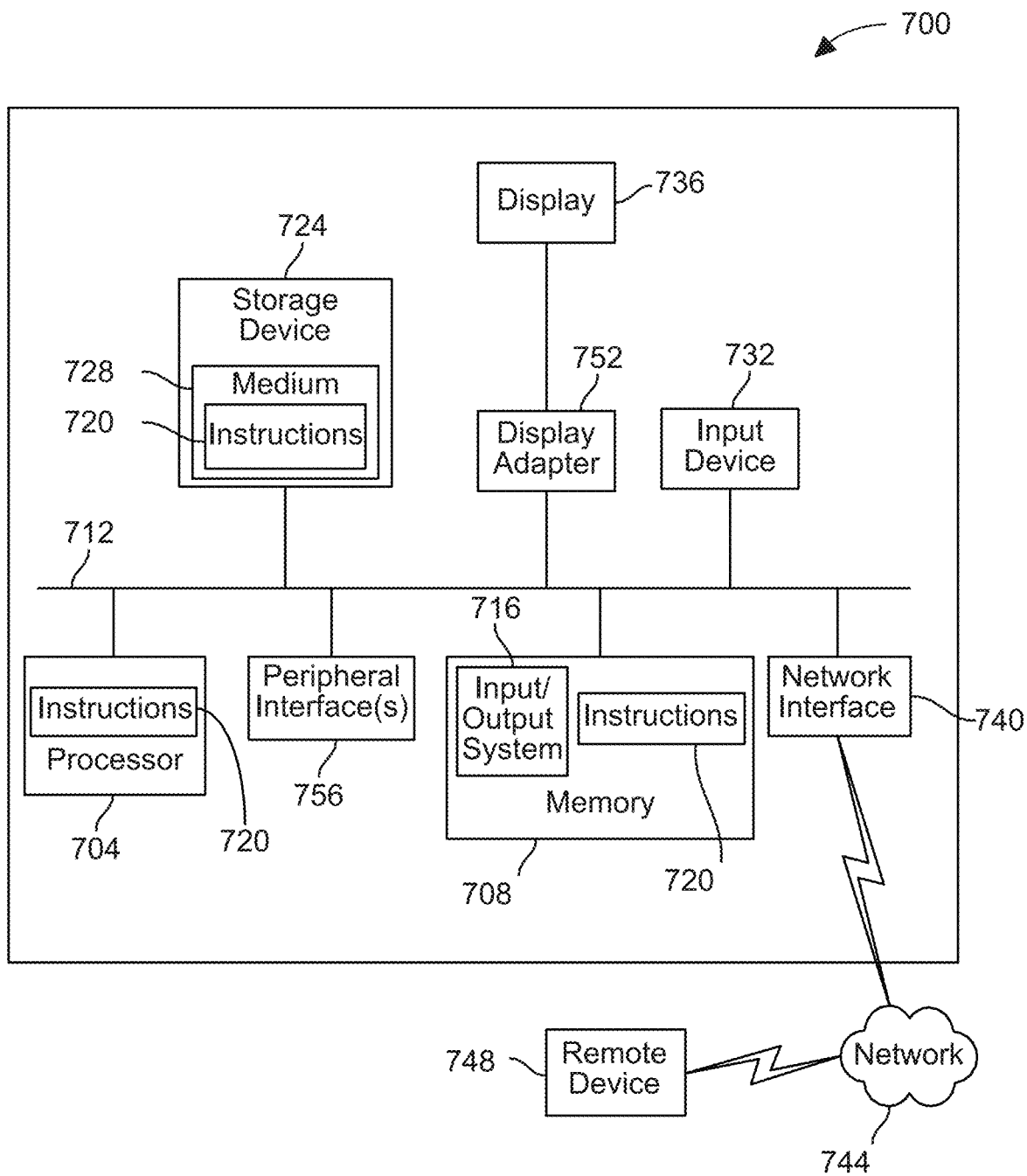
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1794 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for treating a growth medium via an electrical discharge, the apparatus comprises a treatment chamber, at least a reservoir, a plasma reactor, an injector, a pressure regulation system, and an ignition unit comprising:
   a voltage source configured to provide an electrical voltage;
   a converter configured to convert the electrical voltage from a direct current (DC) voltage input to an alternating current (AC) voltage output; and
   an electrical connection interface configured to electrically connect the converter to at least one electrode of a pair of electrodes disposed in the plasma reactor, wherein the pair of electrodes comprises a first electrode and a second electrode;

a feedback mechanism comprising a sensor configured to detect reaction data related to reactions within a reaction region disposed between the first electrode and the second electrode; and a control module communicatively connected to the feedback mechanism, wherein the control module is configured to:

initiate a generation of an electrical discharge in the reaction region as a function of the AC voltage output, wherein the reaction region is configured to: enable an interaction between the electrical discharge and a growth medium contained in the treatment chamber.

2. The apparatus of claim 1, wherein the first electrode of the at least a pair of electrodes is configured to diverge from the second electrode of the at least a pair of electrodes.

3. The apparatus of claim 1, wherein each electrode of the at least a pair of electrodes comprises a pitch angle of 12 degrees.

4. The apparatus of claim 1, wherein the reaction region comprises a plurality of points of arc between the first electrode of the at least a pair of electrodes and the second electrode of the at least a pair of electrodes.

5. The apparatus of claim 1, wherein the at least one electrode of the pair of electrodes comprises a dielectric insulation.

6. The apparatus of claim 1, wherein the conversion is configured to the DC voltage input to a high-voltage discharge at 10,000 kHz (10 MHz).

7. The apparatus of claim 1, wherein the sensor comprises at least one sensor selected from plurality of sensors consisting of a voltage sensor, a current sensor, a temperature sensor, a moisture sensor, and an optical sensor.

8. The apparatus of claim 1, wherein the reaction data comprises a plurality of electrical discharge parameters, a plurality of fluid parameters, and a plurality of growth medium parameters.

9. The apparatus of claim 1, wherein the control module is configured to:

receive the reaction data detected by the sensor from the feedback mechanism; and adjust at least a treatment parameter of the apparatus as a function of the reaction data.

10. The apparatus of claim 9, wherein adjusting the at least a treatment parameter comprises:

training a treatment machine-learning model using treatment training data, wherein the treatment training data comprises a plurality of reaction data as input correlated to a plurality of treatment parameters as output; and determining at least a treatment parameter as a function of the trained treatment machine-learning model.

11. The apparatus of claim 1, wherein the at least one electrode of the pair of electrodes comprises a dielectric insulation.

12. A method for treating a growth medium via an electrical discharge, the method comprises:

providing, by a voltage source, an electrical voltage;

converting, by a converter, the electrical voltage from a direct current (DC) voltage input to an alternating current (AC) voltage output;

connecting, by an electrical connection interface, the converter to at least one electrode of a pair of electrodes disposed in a plasma reactor electrically, wherein the pair of electrodes comprises a first electrode and a second electrode;

initiating, by a control module, a generation of an electrical discharge in a reaction region disposed between the first electrode and the second electrode;

enabling, by the reaction region, an interaction between the electrical discharge and a growth medium contained in the treatment chamber; and detecting, by a feedback mechanism, reaction data using a sensor, wherein the reaction data is related to reactions within the reaction region.

13. The method of claim 12, wherein the first electrode of the at least a pair of electrodes is configured to diverge from the second electrode of the at least a pair of electrodes.

14. The method of claim 12, wherein each electrode of the at least a pair of electrodes comprises a pitch angle of 12 degrees.

15. The method of claim 12, wherein the reaction region comprises a plurality of points of arc between the first electrode of the at least a pair of electrodes and the second electrode of the at least a pair of electrodes.

16. The method of claim 12, wherein the converter is configured to the DC voltage input to a high-voltage discharge at 10,000 kHz (10 MHz).

17. The method of claim 12, wherein the sensor comprises at least one sensor selected from a plurality of sensors consisting of a voltage sensor, a current sensor, a temperature sensor, a moisture sensor, and an optical sensor.

18. The method of claim 12, wherein the reaction data comprises a plurality of electrical discharge parameters, a plurality of fluid parameters, and a plurality of growth medium parameters.

19. The method of claim 12, wherein the method further comprises steps of:

receiving, by the control module, the reaction data detected by the sensor from the feedback mechanism; and adjusting, by the control module, at least a treatment parameter of the apparatus as a function of the reaction data.

20. The method of claim 19, wherein adjusting the at least a treatment parameter comprises:

training, by the control module, a treatment machine-learning model using treatment training data, wherein the treatment training data comprises a plurality of reaction data as input correlated to a plurality of treatment parameters as output; and determining, by the control module, at least a treatment parameter as a function of the trained treatment machine-learning model.

* * * * *